United States Patent
Buffet et al.

(10) Patent No.: US 7,814,429 B2
(45) Date of Patent: Oct. 12, 2010

(54) COMPUTERIZED COLLABORATIVE WORK

(75) Inventors: Jean Buffet, Sartrouville (FR); Duy Minh Vu, Paris (FR); Guénolé Gicquel, Courbevoie (FR)

(73) Assignee: Dassault Systemes, Cedex (FR)

( * ) Notice: Subject to any disclaimer, the term of this patent is extended or adjusted under 35 U.S.C. 154(b) by 581 days.

(21) Appl. No.: 11/818,014

(22) Filed: Jun. 13, 2007

(65) Prior Publication Data
US 2008/0276184 A1 Nov. 6, 2008

(30) Foreign Application Priority Data
Jun. 14, 2006 (EP) .................... 06290975

(51) Int. Cl.
*G06F 13/00* (2006.01)
*G06F 15/00* (2006.01)

(52) U.S. Cl. ...................... 715/763; 345/429
(58) Field of Classification Search .......... 715/802, 715/850, 763–765; 345/416, 429; 707/8, 707/10
See application file for complete search history.

(56) References Cited

U.S. PATENT DOCUMENTS

| | | | |
|---|---|---|---|
| 5,559,942 A | 9/1996 | Gough et al. | |
| 5,678,040 A | 10/1997 | Vasudevan et al. | |
| 5,845,288 A | 12/1998 | Syeda-Mahmood et al. | |
| 6,219,045 B1 * | 4/2001 | Leahy et al. | 715/757 |
| 6,247,019 B1 | 6/2001 | Davies | |
| 6,938,070 B2 | 8/2005 | Esposito | |
| 7,176,942 B2 | 2/2007 | Chartier et al. | |
| 7,663,625 B2 | 2/2010 | Chartier et al. | |
| 2002/0073375 A1 | 6/2002 | Hollander | |
| 2002/0087516 A1 | 7/2002 | Cras et al. | |
| 2002/0184246 A1 * | 12/2002 | Shkolnik | 707/203 |
| 2003/0222924 A1 | 12/2003 | Baron | |

FOREIGN PATENT DOCUMENTS

| | | |
|---|---|---|
| EP | 0 558 006 A2 | 9/1993 |
| EP | 1 059 581 A2 | 12/2000 |

(Continued)

OTHER PUBLICATIONS

Blasquez, I., et al. "Undo Facilities for the Extended Z-buffer in NC Machining Simulation," *Computers in Industry* 53:2 pp. 193-204 (Feb. 2004).

(Continued)

*Primary Examiner*—Cao Nguyen
(74) *Attorney, Agent, or Firm*—Hamilton, Brook, Smith & Reynolds, P.C.

(57) ABSTRACT

The method of collaborative work takes place between a first user working on a first object (1) on the basis of a visual representation of the first object displayed in an authoring environment of a first local computer; and a second user working in an authoring environment of a second local computer connected with the first computer via a computer network. The method comprising the steps of:
  a) selecting at the first computer one type among a plurality of types of data about the first object, each type of data comprising visual representation data about the first object;
  b) providing to the second computer data about the first object according to the selected type;
  c) displaying a visual representation of the first object in the authoring environment of the second computer.

22 Claims, 24 Drawing Sheets

FOREIGN PATENT DOCUMENTS

| | | |
|---|---|---|
| EP | 1 672 548 A1 | 6/2006 |
| EP | 1 672 549 A1 | 6/2006 |
| EP | 1 868 149 A1 | 12/2007 |
| JP | 2003 44519 | 2/2003 |
| WO | WO 01/50300 A2 | 7/2001 |
| WO | WO 01/97095 A2 | 12/2001 |
| WO | WO 03/032205 A1 | 4/2003 |

OTHER PUBLICATIONS

Lababidi, H.M.S., et al. "An Intelligent Graphical User Interface for a Design Environment," *Intelligent Systems Engineering* pp. 190-196 (1992).

"Le Point Sur Les Bases" Electronique Industrielles, Societe Des Editions Radio, Paris, FR, No. 75 pp. 112-117 (Sep. 1984).

Liong, Lim, MS Spy++ Style Window Finder [online], Jul. 13, 2002 [retrieved on Jul. 9, 2005]. Retrieved from the Internet <URL:http//www.codeproject.com>.

McKinney, K., et al. "Visualization of Construction Planning Information," International Conference on Intelligent User Interfaces, San Francisco, CA, Jan. 6-9, pp. 135-138 (1998).

Morrow, T.M., et. al. "DIVIDE: Distributed Visual Display of the Execution of Asynchronous, Distributed Algorithms on Loosely-Coupled Parallel Processors," *Visualization '93 Proceeding*.

Nemetschek, A.G., "Neues in Allplan 2003," *Neues in Allplan*, Dec. 2002.

Netmetschek, A.G., "Neues in Allplan 2004," *Neues in Allplan*, Jan. 2004.

Netmetschek, A.G., "Allplan Version 12," *Handbuch Architektur*, Nov. 1996.

Nospin Group, Basic Guide to MS Word v6 2000. Free PC Tech Homepage [online] Feb. 2001 [retrieved on Jul. 29, 2005]. Retrieved from the Internet URL: http://freepctech.com.

Ramesh, B., et al., "Process Knowledge Based Rapid Prototyping for Requirements Engineering," Requirements Engineering (1993).

Toye, G., et al., "SHARE: A Methodology and Environment for Collaborative Work Product and Development," *Enabling Technologies: Infrastructure for Collaborative Enterprises* (1993).

Vandenberg, E., "Web-based Collaborative Modelling with SPIFF," *Tu Delft* (2003).

Verlinden, J.C., et al., "Snapshots and Bookmarks as a Graphical Design History," *International Conference* (May 2002).

World Pumps, Trade and Technical Press Ltd., 2000(402), (Mar. 2000).

* cited by examiner

COMPUTERIZED COLLABORATIVE WORK

RELATED APPLICATION

This application claims priority under 35 U.S.C. §119 or 365 to European Patent Application No. EP 06290975.9, filed Jun. 14, 2006.

The entire teachings of the above application are incorporated herein by reference.

FIELD OF THE INVENTION

The invention relates to a method of collaborative work between a first user working on a first object on the basis of a visual representation of the first object displayed in an authoring environment of a first local computer, and a second user working in an authoring environment of a second local computer, the first computer and the second computer being connected via a computer network. The invention also relates to computer software for allowing collaborative work.

BACKGROUND OF THE INVENTION

The invention relates to collaborative work of several users working on common or related objects—which are usually stored in a common centralized database but not necessarily—wherein each user works on a respective local computer environment connected to a computer network common to all users. Users have to collaborate with each other when the work of one impacts the work of the other(s). In other words, users need to share information about their respective work with the others. However, sharing information between users has issues especially when users are located in different geographical areas which may be far-off each others, e.g. in different buildings, towns or countries. In such a case, users need to share information with the help of their respective computers via the common computer network.

The invention relates more particularly to collaborative work in the case in which users work on objects based on the representation thereof displayed in a graphical user interface (GUI).

Such a need exists in various computer-aided techniques, notably in applications such as CAD, CAE and CAM and more generally in PLM applications.

CAD stands for Computer-Aided Design and relates to software solutions for authoring product design. CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of parts or assemblies of parts, forming a product, such as the one provided by Dassault Systèmes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are essentially specifications of geometry. Specifically, CAD files contain specifications, from which geometry is generated, which in turn allows for a representation to be generated. Specifications, geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files.

In computer-aided techniques, the graphical user interface (GUI) plays an important role as regards the efficiency of the technique.

PLM stands for Product Lifecycle Management which refers to a business strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Some PLM solutions make it for instance possible to design and develop products by creating digital mockups (a 3D graphical model of a product). For instance, the digital product may be first defined and simulated using an appropriate application. Then, the lean digital manufacturing processes may be defined and modeled.

The PLM solution provided by Dassault Systèmes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service. Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

Product lifecycle information, including product configuration, process knowledge and resources information are typically intended to be edited in a collaborative way.

To this respect, a collaborative workspace can be defined as an interconnected environment in which participants in the product lifecycle (design and also marketing, sales, manufacturing, OEMs, suppliers, and customers) can access and interact with each other's "In-Work" designs, thereby enhancing communication through exchange, direct use, simulation and validation in 3D.

Generally speaking, there exists two trends for enabling collaborative work of users working on the picture of objects displayed on GUIs in their local computer environment.

A first trend consists in providing a specific collaborative workspace accessible by each user on its local computer. This collaborative workspace is distinct from the user's own workspace in which he works on the object(s) he is responsible for. So, when users wish to collaborate, they have to select and copy objects displayed in their own workspace and paste them in the collaborative workspace to enable other users to view them in the collaborative workspace. As a result, a user's own workspace is displayed in a first window and the collaborative workspace is displayed in another window in the GUI of the user's computer.

A first drawback thereof is related to the fact that when a first user pastes an object in the collaborative workspace at the request of a second user, the latter has to merge mentally his own object displayed in his workspace and the object of the first user displayed in the collaborative workspace in order to have an idea of the result of the possible merge of the objects. This mental operation can prove to be quite difficult for a user. It is even further true as the object displayed in his own workspace and the object of the first user displayed in the collaborative workspace are likely to be displayed in different contextual viewing situations, e.g. different scales or different viewpoints.

A second drawback is due to the fact that when users make modifications to objects in the collaborative workspace (in the case this possibility is provided) and wish to confirm these modifications, they have to make again the same modifications subsequently in their own workspace.

A second trend consists in giving each user the possibility to access fully in its own workspace objects of other users and to chat with each other via the common network. In fact, there is no collaborative workspace for graphical objects in such a case. For example, in the case of a CAD application, a user can chat with a second user, but he cannot send to him a view of the object on which he is working in his own workspace. Therefore, the second user has to access the central database and load the full data of the first user's object in his own workspace. As a result, the second user's workspace contains the full data of both the second user's object and the first user's object which are merged in it.

A drawback thereof is that the second user does not know the result of the merge as long as he has not actually loaded and merged the full data of the first user's object in his own workspace. So, it may happen he wishes to undo the merging operation and remove the data of the first user's object in the case he is not satisfied therewith. For example, the second user may have loaded an undesired object of the first user due to a misunderstanding with the first user. But undoing the merging operation may prove to be complicated and time consuming.

Another drawback thereof is that the second user may not have the required rights to modify the first user's object. So, the second user is not able to modify in his own workspace the first user's object e.g. in the case the second user wishes to suggest to the first user a modification of the latter's object.

SUMMARY OF THE INVENTION

The object of the present invention is to alleviate at least partly the above mentioned drawbacks.

Therefore, the invention provides a method of collaborative work between:
a first user working on a first object on the basis of a visual representation of the first object displayed in an authoring environment of a first local computer; and
a second user working in an authoring environment of a second local computer;
wherein the first computer and the second computer are connected via a computer network, the method comprising the steps of:
a) selecting at the first computer one type among a plurality of types of data about the first object, each type of data comprising visual representation data about the first object;
b) providing to the second computer data about the first object according to the selected type;
c) displaying a visual representation of the first object in the authoring environment of the second computer.

Preferred embodiments comprises one or more of the following features:
step b) comprises the substep of sending at least a part of the data about the first object according to the selected type from the first computer to the second computer;
step b) comprises the substeps of:
sending information about a path in the network from the first computer to the second computer;
causing the second computer to download at least a part the data about the first object according to the selected type according to the path in the network;
the steps are further defined as follows:
in step b), the data about the first object provided to the second computer comprise viewing context data about the visual representation of the first object as displayed on the screen of the first computer;
in step c), the visual representation of the first object is displayed in the authoring environment of the second computer in a viewing context corresponding to the viewing context data;
the first object is defined by first solid geometry data and specifications, the first solid geometry and specifications being available at the first computer;
at least one type among the plurality of types of data about the first object does not comprise the specifications so that when selected in step a), the specifications are not available at the second computer when carrying out step c);
one type of data about the first object comprises the first solid geometry data without specifications so that when selected in step a), the specifications are not available at the second computer when carrying out step c);
one type of data about the first object comprises the first solid geometry data and specifications;
one type of data about the first object comprises a snapshot image of at least a part of the visual representation of the first object as displayed on the screen of the first local computer;
the method comprises a step of displaying a graphical tool on the screen of the first computer, the graphical tool delimiting a zone in the authoring environment of the first computer, wherein the zone delimited by the graphical tool in the authoring environment of the first computer determines the parts of the first object for which visual representation data are comprised in the data about the first object provided in step b);
the zone delimited by the graphical tool is adapted to be resized and/or to be changed of location in the authoring environment of the first computer;
the method comprises a step of displaying a graphical tool on the screen of the second computer, the graphical tool delimiting a zone in the authoring environment of the second computer, wherein in step c), the visual representation of the first object in the authoring environment of the second computer is displayed in the zone delimited by the graphical tool in the authoring environment of the second computer;
the method comprising a step of displaying a chat-entry box and a chat-display box on the screen of the first computer and on the screen of the second computer enabling the first user and the second user to exchange messages via the network;
the second user works on a second object on the basis of a visual representation of the second object displayed in the authoring environment of the second local computer, and in step c), the visual representation of the first object is displayed together with a visual representation of the second object in the authoring environment of the second computer so as to provide a combined representation of the first object and of the second object in a same viewing context;

in step c), the visual representation of the first object is displayed together with a visual representation of the second object in the authoring environment of the second computer so as to provide a combined representation of the first object and of the second object in a same viewing context corresponding to the viewing context data;

the type of data selected in step a) comprises a snapshot image of at least a part of the visual representation of the first object as displayed in the authoring environment of the first local computer, and in step c), the snapshot of the first object and the visual representation of the second object are displayed in superimposed condition;

the second object is defined by second solid geometry data available at the second computer, the type of data selected in step a) comprises the first solid geometry data, and in step c), the first object and the second are displayed in merged condition.

the type of data selected in step a) comprises the first solid geometry data, the method comprising after step c) the steps of:

d) modifying the first object at the second computer;

e) sending a visual representation of the modified first object from the second computer to the first computer;

f) displaying the visual representation of the modified first object in the authoring environment of the first computer.

According to another aspect, the invention provides a computer software for allowing collaborative work of a first user working on a first object based on a visual representation of the first object displayed in the authoring environment of a first local computer with a second user working on a second local computer connected to the first computer via a network, wherein the computer software run on the first computer enables the first user:

to select at the first computer one type among a plurality of types of data about the first object, each type of data comprising visual representation data about the first object;

to send from the first computer to the second computer data about the first object according to the selected type and/or information about a path in the network where data about the first object according to the selected type are downloadable.

In preferred embodiments, the computer software implements the steps defined for the first computer in any one of the embodiments of the method according to the invention.

According to another aspect, the invention provides a computer software for allowing collaborative work of a user working on a local computer with another user working on another local computer connected to the computer via a network, wherein the computer software run on the computer is adapted to carry out the steps defined for the second computer in any one of the embodiments of the method according to the invention.

Further features and advantages of the invention will appear from the following description of embodiments of the invention, given as non-limiting examples, with reference to the accompanying drawings listed hereunder.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

We will describe an example scenario of a collaborative work in relation to FIGS. 1-22 for two users called respectively Jean Buffet and Duy Minh Vu.

Jean and Duy work on a PLM computer application such as the PLM solution provided by Dassault Systèmes under the trademarks CATIA, ENOVIA and DELMIA. Jean and Duy are more particularly involved in the design of spare parts of an assembly. Both Jean and Duy work in a respective authoring environment on a respective computer having a GUI and any usual related equipment such as a keyboard and graphical pointer device such as a mouse. Their computers are connected to a same network. The figures illustrate the situation in which Jean and Duy are in course of designing respective spare parts which are related and therefore want to go into a collaborative work.

As the type of elements displayed in the respective workspaces of Duy and Jean as well as their functions are similar, like elements in the screenshots of Jean's workspace have the same numeral references as in the screen shots of Duy's workspace, except that '10' is added in front of them. Further, the description of the functions and properties given for elements in one workspace are also applicable for the like elements of the other workspace, and so will not be repeated.

Figure 1:
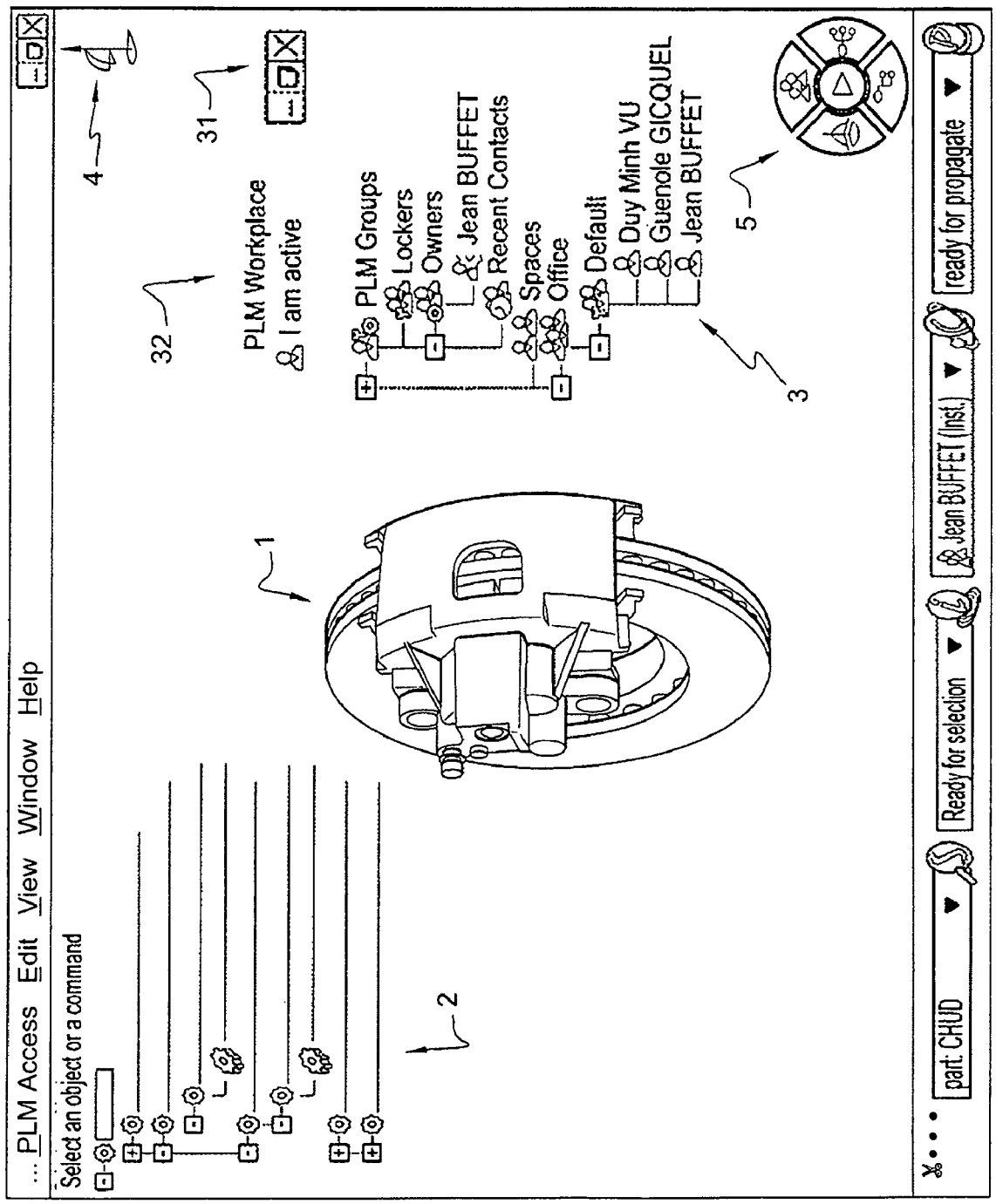
FIGS. 1-22 show successive screenshots of the displays on respective computers in an example of collaborative work between two users carried out according to the invention.

FIG. 1 shows a screenshot of Duy's workspace displayed on his computer before starting the collaborative work with Jean. Duy is currently working in his authoring environment on an object 1—i.e. on a brake in our example—for which he is responsible. So a three-dimensional view of brake 1 is displayed in the central portion of the screen. Duy may change the point of view of object 1 by, for example, selecting a point within the screen with the mouse and dragging it thereby causing rotation of object 1. He may also zoom forward or backward on object 1.

A specification tree 2 is displayed in the upper left portion of the workspace. Specification tree 2 is of an immersive type, i.e. it is not located in another workspace than object 1 e.g. in a different window, but within the same one. Specification tree 2 provides contextual information about object 1 on which Duy is currently working. More particularly, specification tree 2 identifies object 1 as well as its subsets. Specification tree 2 can be drilled up and down by selecting its nodes with the mouse. Specification tree 2 allows the user to access attributes of the object and the subsets by selecting the corresponding item in the tree with help of the mouse. The attributes may be of any type that can be defined by users such as mechanical or thermal constraints, providers, persons responsible for their design, etc.

Another tree 3 is displayed on the right portion of the workspace with the title "PLM workplace". Similarly to specification tree 2, tree 3 is of an immersive type and can be drilled up and down. PLM workplace tree 3 provides contextual information about the users. More particularly, the node called "PLM groups" lists the contextual data about the current working session. The node called "Spaces" lists the other users with whom Duy is currently under collaborative work. The node called "Office" lists the other users that are currently connected at the network. The user may change the location of PLM workplace tree 3 by selecting the bar 32 containing the title thereof and dragging it to another location within the workspace with help of the mouse. The user may also remove PLM workplace tree 3 from the display by reducing it to a thumbnail located in the bar below the workspace by selecting a corresponding box (indicator) 31 with the mouse. Using known techniques, the user may display it again in the workspace by selecting the thumbnail in the bar e.g. with the mouse.

A software tool 4 is displayed in the upper right corner of the workspace. Tool 4 is also of an immersive type. Tool 4 provides viewing context information about object 1 as currently displayed in the workspace. As described in European patent application EP 1 059 581, said immersive tool 4 is a three-dimensional compass enabling, for example, to remotely manipulate the displayed objects on the screen.

Due to the fact that specification tree 2, PLM work place tree 3 and tool 4 are of immersive type, the user is always aware that he is in his workspace and that these trees and tools are related to object 1.

Another software tool 5 in the form of a compass with four different fields is displayed in the lower right portion of the workspace. This tool is also of immersive type thereby indicating to the user that it makes part of the PLM application. Tool 5 enables the user to render the displayed object 1 according to various attributes using a PLM database, said database containing modeled objects and relations between said modeled objects. The modeled objects are associated to a set of values of attributes stored in the database or computable based on relations involving said modeled objects. After the selection of an attribute (through the selection of one of the four fields of the tool 5, the object 1 is rendered in the view according to its value of the attribute. Tool 5 may also trigger a simulation of object 1.

Such tool 5 may be of the type disclosed in European Patent applications no. 1 672 548 and no. 1 672 549 which are herewith incorporated by reference.

Figure 2:
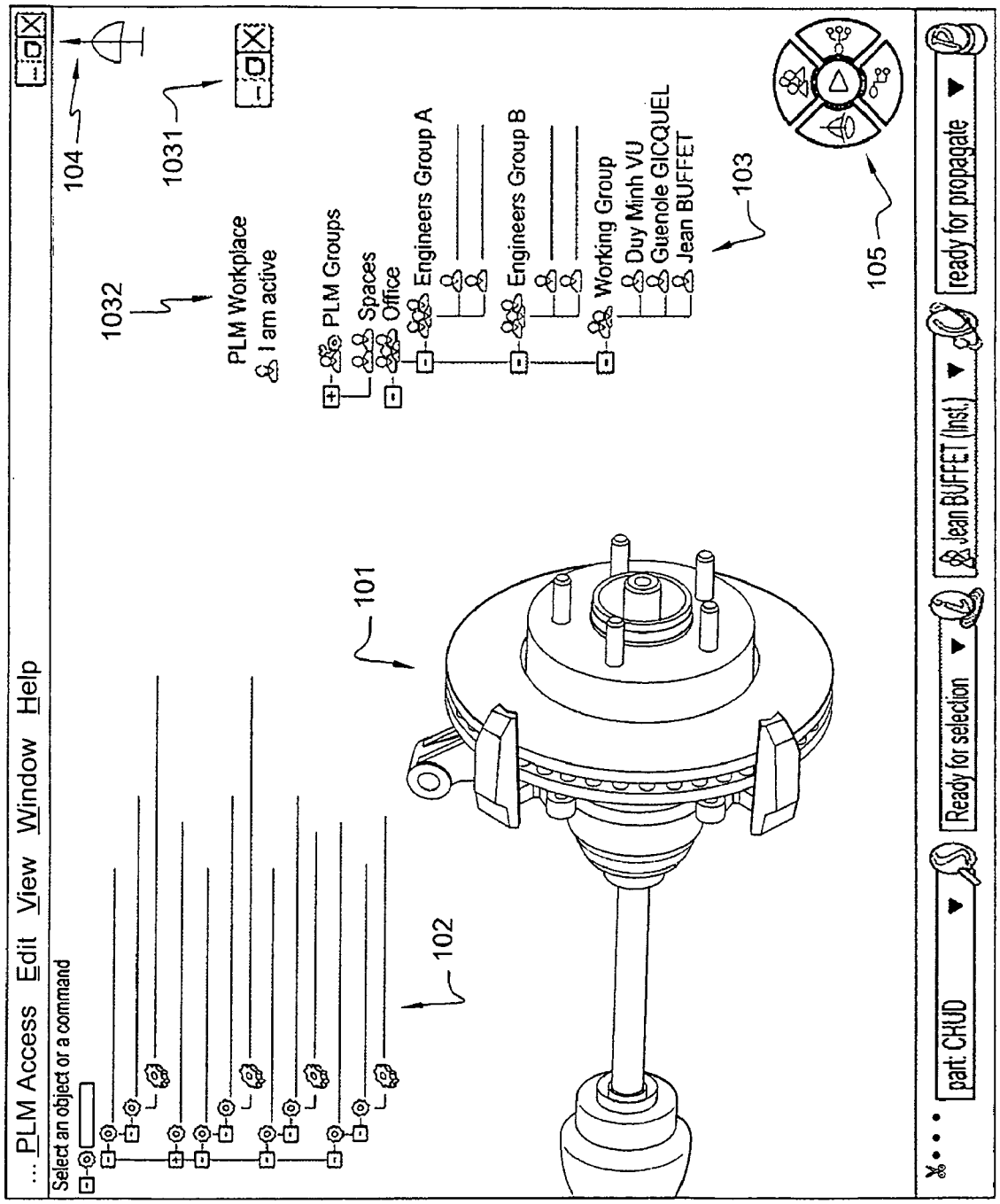

FIG. 2 shows a screenshot of Jean's workspace displayed on his computer before starting Duy attempts to initiate collaborative work with him. As can be seen, Jean's workspace contains like elements 101, 102, 103, 104, 105 with the same functions and properties as described for Duy's workspace in relation to FIG. 1. One will understand that all these elements 101, 102, 103, 104, 105 are related to the context of Jean's workspace. So, Jean is currently working on object 101 which is different from object 1 although these spare parts make part of a same (common) assembly. Alternatively, object 1 and object 101 could also be different portions of a same spare part. Further, the contextual information provided by specification tree 102 and PLM workplace tree 103 as well as tool 104 are related to object 101.

Figure 3:
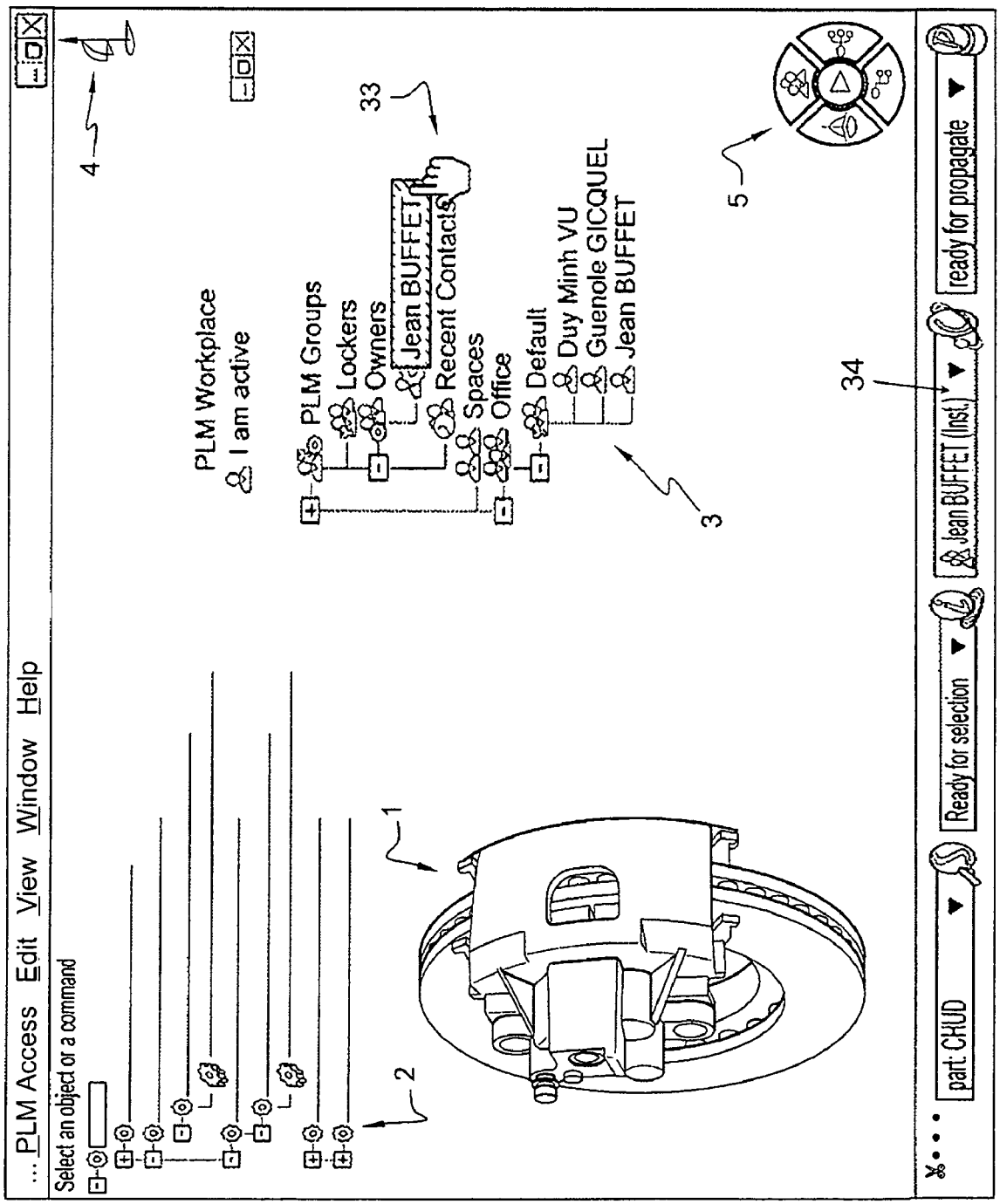

FIG. 3 shows a screenshot of Duy's workspace displayed on his computer when initiating a collaborative work session with Jean.

Just before initiating the collaborative work session, Duy determines with whom he wishes to enter into a collaborative work. Therefore, he may use specification tree 2 to determine who is the person responsible for the design of the other spare part about which he wishes to collaborate. More particularly, he identifies the reference of this spare part in specification tree 2 and selects it with the mouse to drill down the attributes thereof among which is the name of the person responsible of its design. These operations are not illustrated in the figures.

In our example, Duy determines that he wishes to collaborate with Jean. To initiate the collaborative work session, Duy selects Jean's name—see reference numeral 33—in the PLM group of PLM workplace tree 3 with the help of his mouse. Alternatively, Duy may use the toolbar 34 displayed on the lower part of the display in order to start the collaborative session with Jean.

Figure 4:
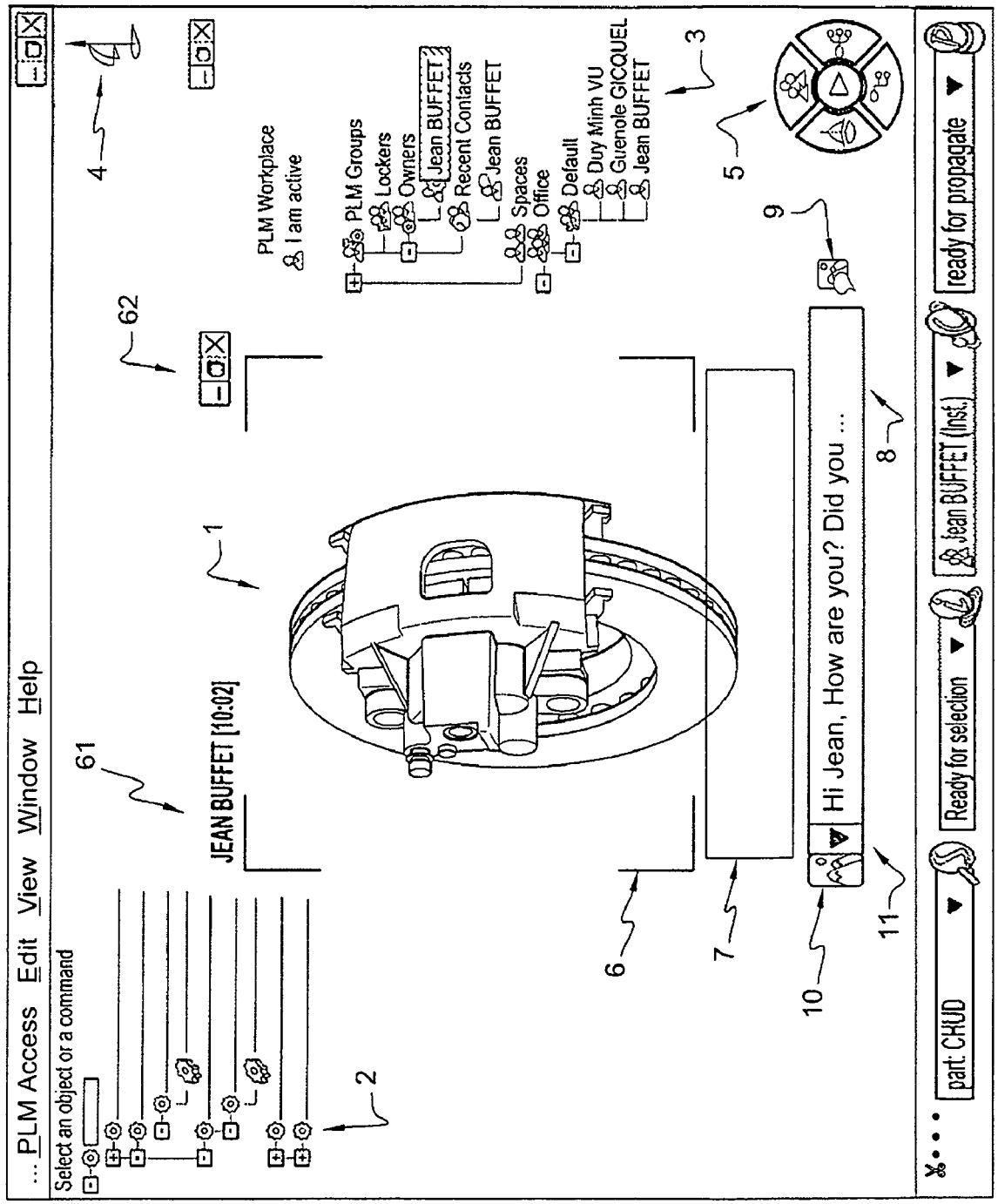

As a result, an email/electronic data messaging type or chat-type application (procedure) is opened (initiated) and several elements are displayed within Duy's workspace of his authoring environment as shown in the screenshot of FIG. 4. These elements are as follows.

A viewfinder 6 such as a kind of visor is displayed in the central portion of the workspace. Viewfinder 6 is in the form of a rectangle but only its corners are displayed with the help of two segments for each. All the parts of object 1 within viewfinder 6 remain fully visible. The user—also called hereafter Duy's collaborator—who will participate in the collaborative work session Duy is initiating is identified just above the left upper portion of viewfinder 6 (see reference 61).

Viewfinder 6 serves to define the image part of object 1 to be sent to the collaborator corresponding to viewfinder 6, i.e. Jean. The user may change the location of viewfinder 6 e.g. by dragging it with the mouse. The user may also resize viewfinder 6 e.g. by dragging a corner or a border of viewfinder 6 with the mouse, or even resize (by way of zooming) the displayed object to place it within the limits of the viewfinder 6.

A chat-display box 7 is displayed below viewfinder 6 and has a background color different from the background of the workspace. Nevertheless, the background of chat-display box 7 is not opaque, but translucent so that chat-display box 7 appears superimposed on object 1 which in turn appears dulled for the parts thereof under chat-display box 7. Chat-display box 7 displays the messages that are exchanged between the users of this collaborative work session, i.e. Duy and Jean, as well as the originator—i.e. Duy or Jean—of each message.

A chat-entry box 8 is displayed below chat-display box 7. Chat-entry box 8 enables the local user—i.e. Duy—to type in messages to be sent to the collaborator, i.e. Jean.

A send message button 9 is displayed at the right end of chat-entry box 8. Send message button 9 enables the local user—i.e. Duy—to send to his collaborator—i.e. Jean—the message he previously typed in chat-entry box 8. Nevertheless, the "Enter" key of the computer keyboard may perform the same action.

A send snapshot button 10 is displayed at the left end of chat-entry box 8. Send snapshot button 10 enables the local user—i.e. Duy—to send to his collaborator—i.e. Jean—a snapshot of the part of object 1 currently within viewfinder 6.

A selector 11 is displayed between send snapshot button 10 and chat-entry box 8. Selector 11 enables the local user—i.e. Duy—to send the 3D geometrical data of the object in his workspace—i.e. object 1—or even the 3D geometrical data with the specifications thereof—i.e. the full design specification in our example—to his collaborator, i.e. Jean.

One will understand that in the described embodiment Duy has the possibility to select any one among three types of data about object 1 providing each another level of details, i.e. the snapshot type, the snapped 3D geometry type and the type consisting in the 3D geometrical data with the whole specification.

Buttons 62 are displayed above the upper right corner of viewfinder 6. One of buttons 62 enables the user—by selecting it with the mouse—to remove all the displayed elements of the collaborative session—i.e. viewfinder 6, collaborator identifier 61, chat-display box 7, chat-entry box 8, send message button 9, send snapshot button 10, selector 11, buttons 62, etc—from the workspace by reducing it to a thumbnail located in the bar below the workspace. The elements of the collaborative session may again be displayed by selecting this thumbnail e.g. with the mouse. Another button among buttons 62 enables the user to end the collaborative session in which case of the elements of the collaborative session are removed from the display. Known or common windowing techniques are employed to accomplish these minimize, restore and close operations of button 62.

The relative location of all displayed elements of the collaborative session is fixed and so they follow viewfinder 6 if dragged to another location. However, all the displayed elements of the collaborative session keep a same size in the case viewfinder 6 is resized.

In FIG. 4, Duy has already typed in a message for Jean. Upon selection of send message button 9 with his mouse, Duy's computer enters into communication with Jean's computer via the network to open the collaborative work session.

Figure 5:
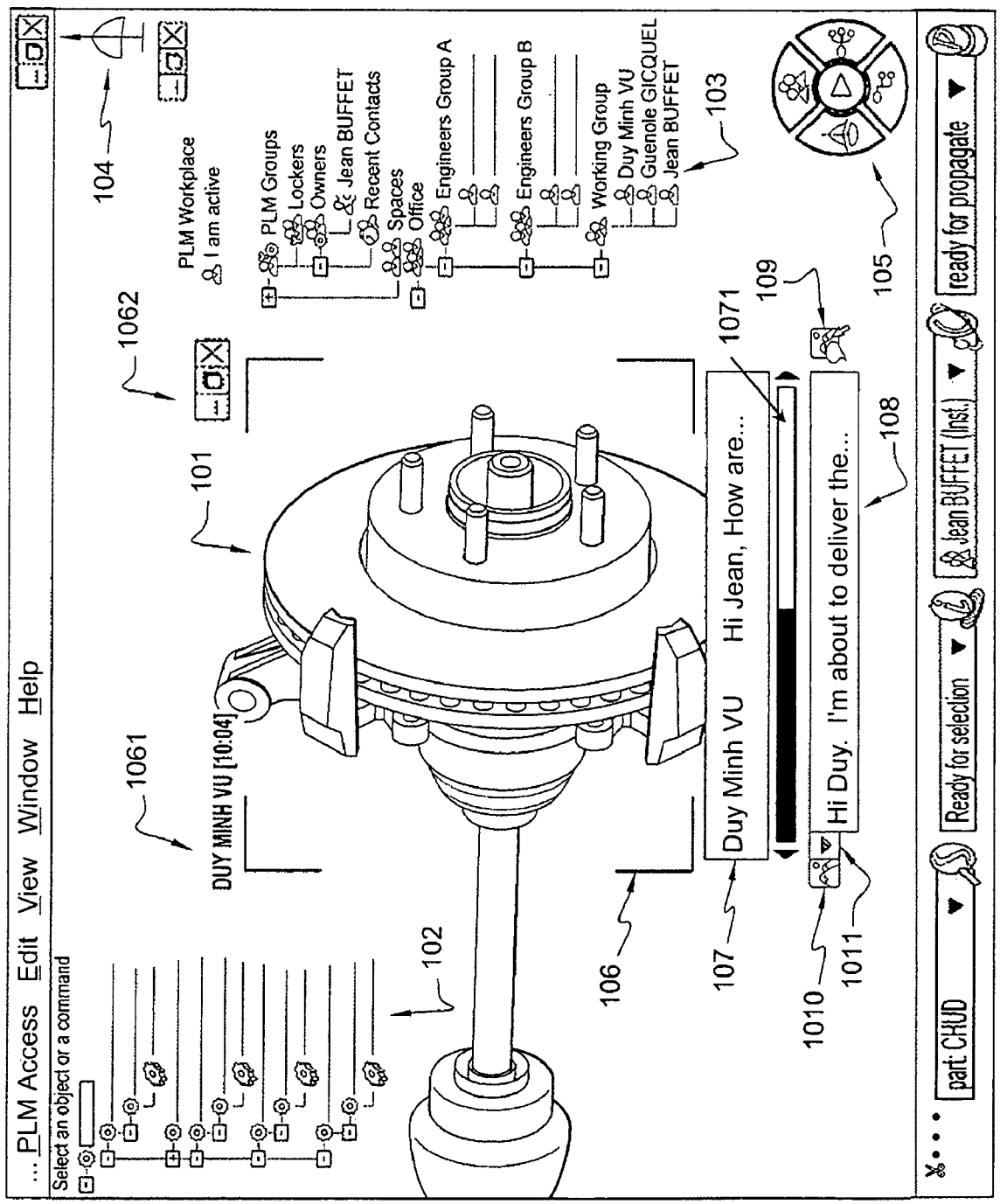

FIG. 5 shows a screenshot of Jean's workspace of his authoring environment displayed on his computer as a result of the fact that Duy's computer entered into communication with Jean's computer to open the collaborative work session.

As can be seen, like elements with the same functions and properties to those of the collaborative session displayed in Duy's workspace of FIG. 4 are in turn displayed in Jean's workspace in FIG. 5. These elements 106, 107, 108, 109, 1010, 1011, 1061 and 1062 are displayed automatically as a result of the collaborative work session initiated by Duy. Alternatively, an indication, information or other signal could be displayed (rendered) in Jean's workspace informing Jean that Duy wishes to open a collaborative work session with him and the possibility is given to Jean to agree or not with Duy's request. As a result, the collaborative work session would only open if Jean agrees and the mentioned elements of the collaborative session would only be displayed in Jean's workspace once he agreed.

Chat-display box 107 displays the message sent by Duy (see FIG. 4).

Jean's workspace is shown in FIG. 5 at a stage in which Jean has already typed into chat-entry box 108 an answer to Duy's message, Jean being about to select the send message button 109.

Figure 6:
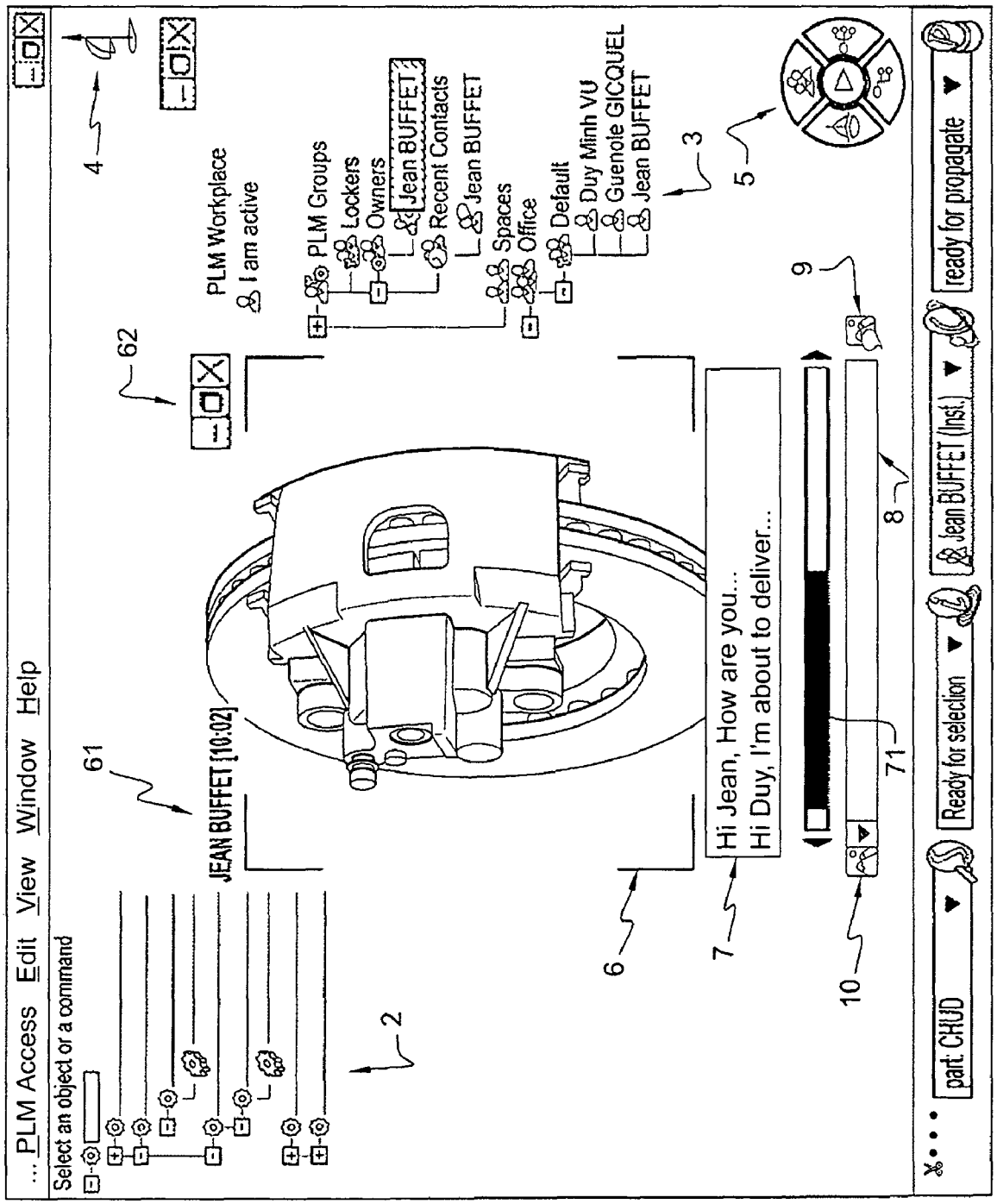

FIG. 6 shows a screenshot of Duy's workspace displayed on his computer as a result of the sending of Jean's answer shown in FIG. 5.

The answer sent by Jean is displayed in chat-display box 7 of Duy's workspace (FIG. 6). The originators of the messages in chat-display 7 are not visible, but can be displayed by lateral scrolling the content of chat-display box 7 by means of control bar 71 with help of the mouse.

As Jean mentioned in his answer that he cannot see a spare part of Duy's i.e. a caliper housing which is in fact object 1. In response, Duy selects the send snapshot button 10 with his mouse or other cursor control/input means.

As a result, Duy's computer sends an image of object 1 as currently displayed in Duy's workspace but limited to the parts thereof within viewfinder 6. The image of object 1 is sent without the background of Duy's workspace behind object 1. Duy's computer sends this image along with viewing context data. These viewing context data are about the viewing context of object 1 as currently displayed in Duy's workspace at the time of taking the snapshot. Viewing context data may in particular comprise information defining the point of view and the scale. In fact, the viewing context data are additional data sent with the snapshot to the collaborator's computer to enable the latter to display its own object—i.e. object 101—in the same context as the sent snapshot. So, viewing context data may comprise the viewpoint, zoom, screen ratio, etc. The viewing context data may also allow Jean's computer to determine the relative position of object 1 and object 101. One will understand that the sent snapshot is only an image of the part of object 1 displayed within viewfinder 6, i.e. the solid geometry data of object 1—which allow 3D representation of object 1 under any point of view and scale—are not sent to Jean's computer.

Figure 7:
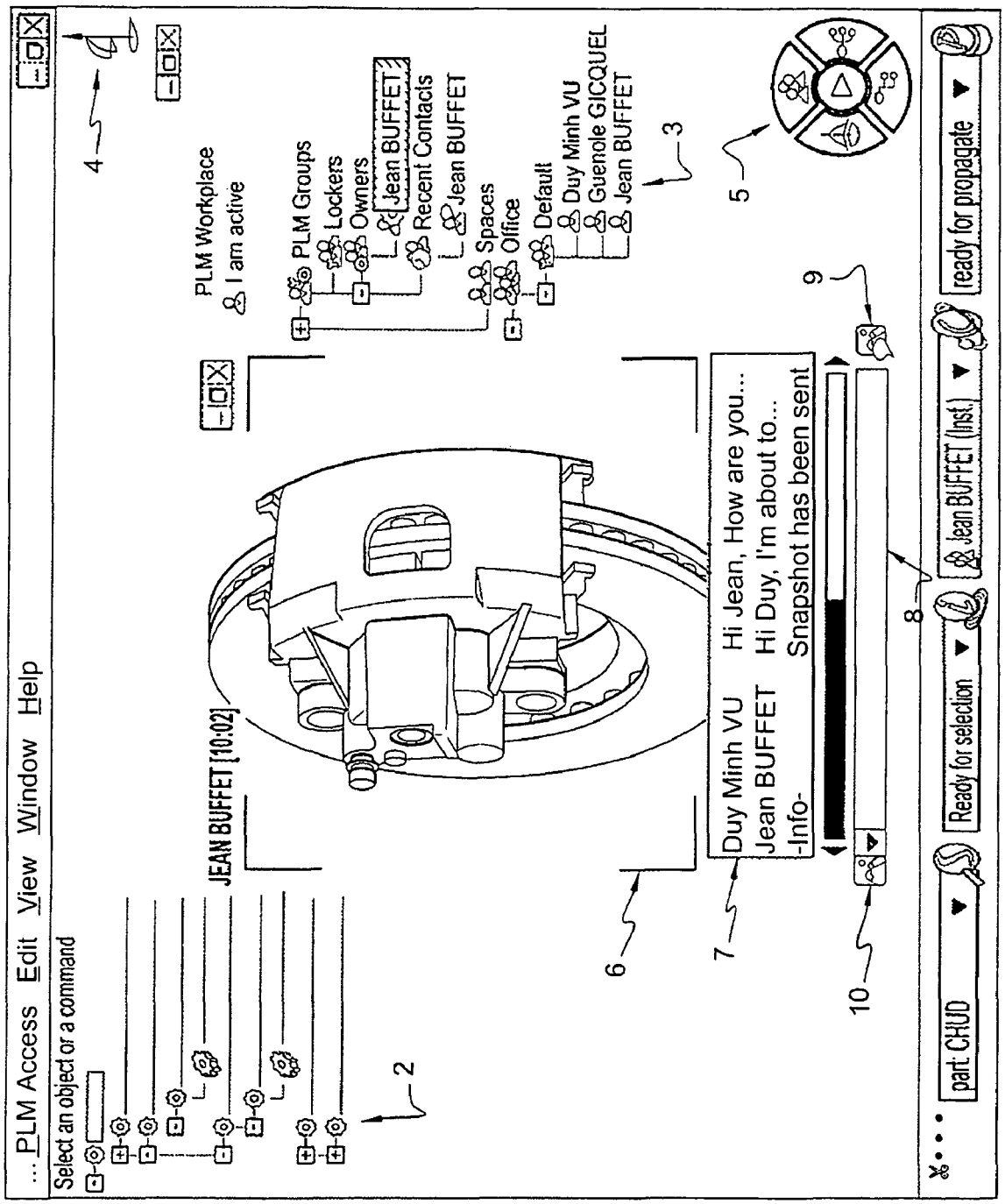

FIG. 7 shows a screenshot of Duy's workspace displayed on his computer as a result of the sending of the snapshot to Jean's computer.

The only difference is the fact that Duy's computer displayed a message in chat-display box 7 to inform Duy that the snapshot has been sent.

Figure 8:
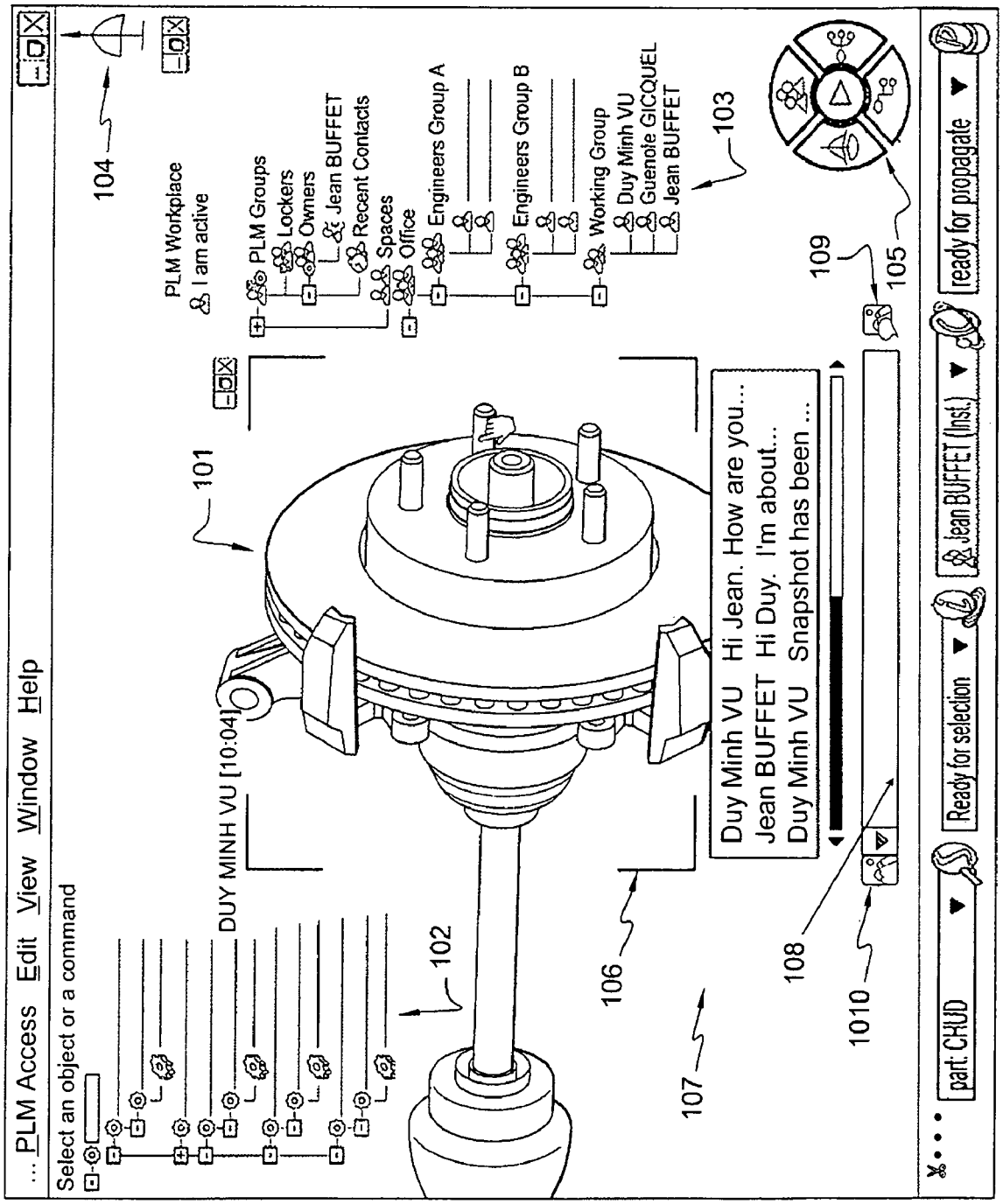

FIG. 8 shows a screenshot of Jean's workspace displayed on his computer as a result of the sending of the snapshot by Duy's computer.

The snapshot sent by Duy is not displayed at this stage. However, a message is displayed in chat-display box 107 informing that the snapshot sent by Duy has been received by Jean's computer and that said snapshot is ready for download to be viewed.

Figure 9:
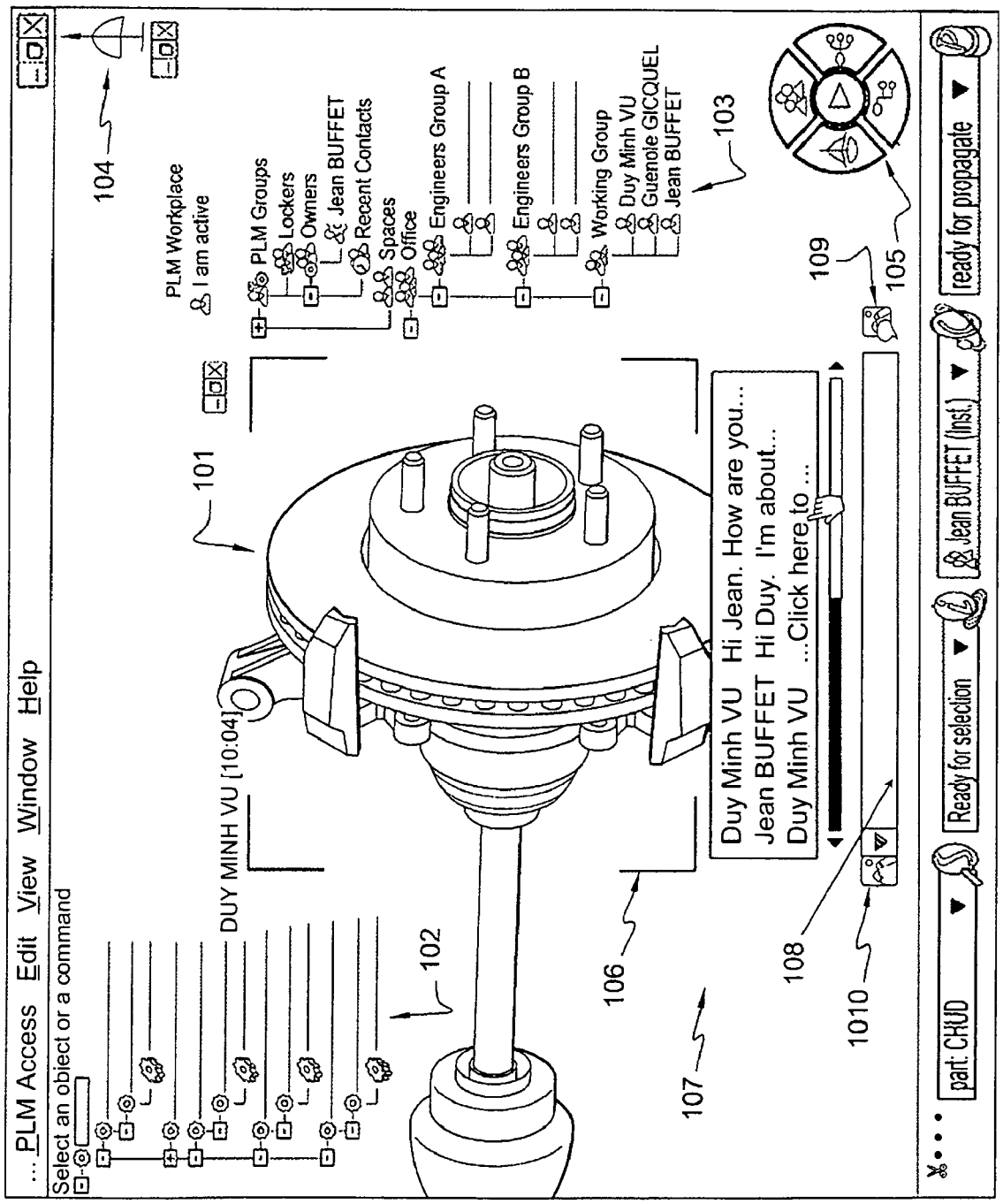

In order to download the snapshot sent by Duy's computer, Jean selects with the mouse the message (in chat display box 107) informing of the receipt of the snapshot as shown in FIG. 9 at the hand-shaped cursor. Electronic message attachment technology supports this function.

Figure 10:
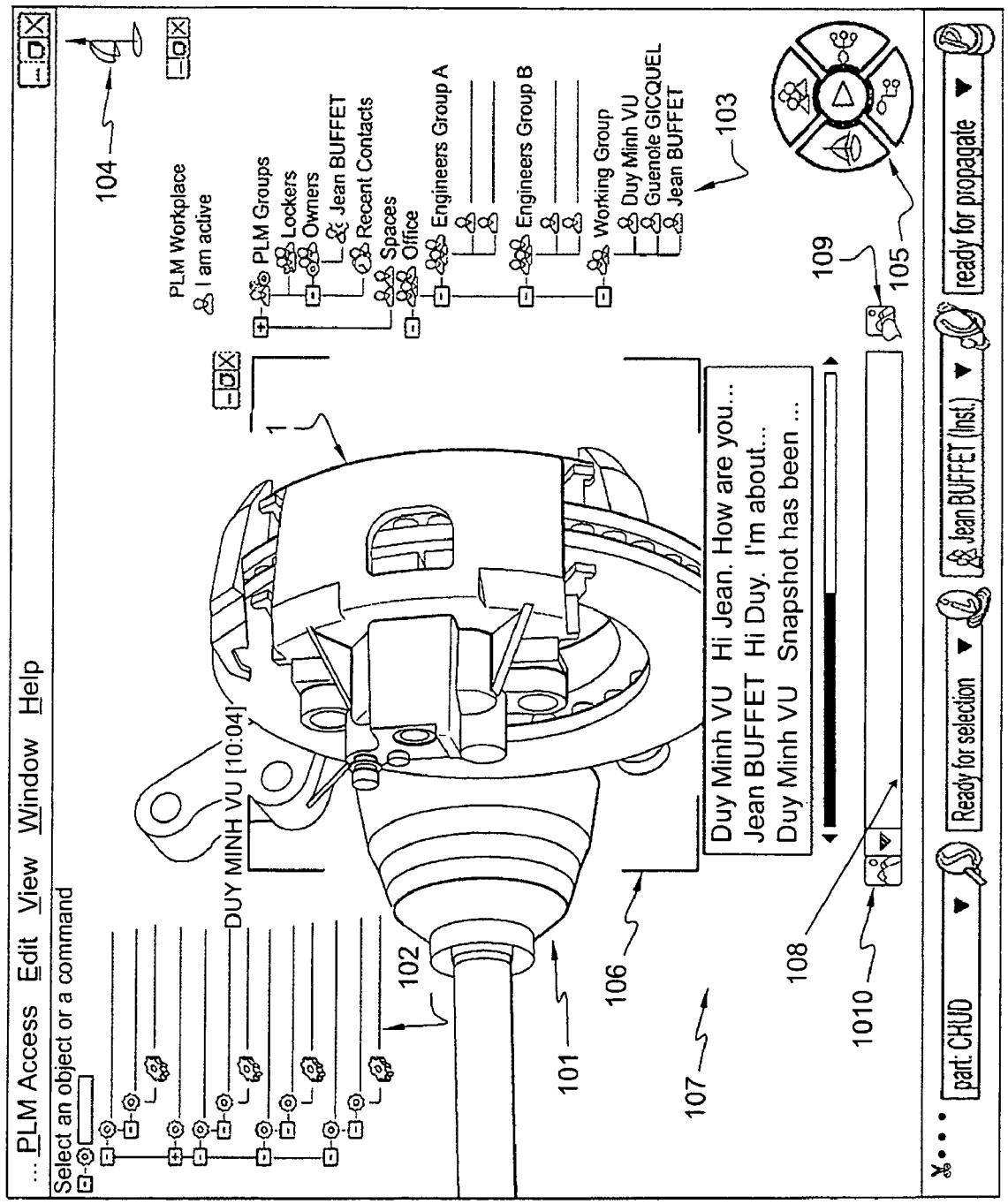

FIG. 10 shows a screenshot of Jean's workspace displayed on his computer as a result of the downloading of the snapshot sent by Duy's computer.

As can be seen, the snapshot of object 1 as sent by Duy's computer is displayed above or superimposed over object 101 in Jean's authoring environment thereby providing a combined representation of object 1 and object 101. The snapshot of object 1 fits exactly in viewfinder 106 that has been resized by Jean's computer to the size of the snapshot of object 1. Further, Jean's computer changed the viewpoint of object 101 to coincide with the viewing context of the snapshot of object 1 based on the viewing context data sent along by Duy's computer with the snapshot. One will understand that the snapshot of object 1 is displayed above or layered over object 101 in Jean's workspace itself in which he works on object 101 at the time he is not involved in a collaborative work, i.e. the representation of object 101 is not copied to another environment (e.g. a different window) in which the snapshot would be displayed as well.

As a result, Jean can see at least approximately the result of a potential merge of object 1 and object 101.

Figure 11:
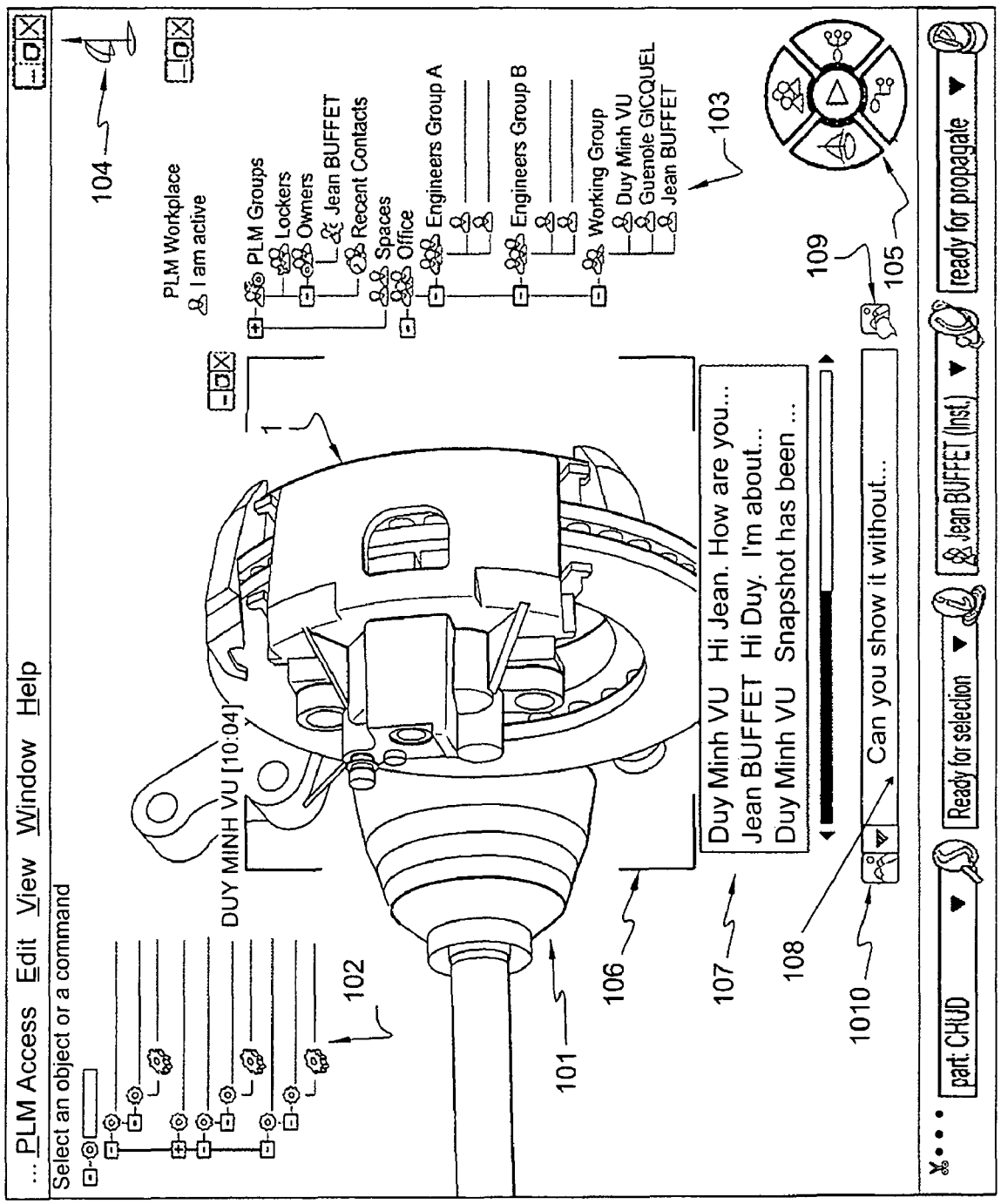

FIG. 11 shows a subsequent screenshot of Jean's workspace displayed on his computer in which Jean has typed in chat-entry box 108 a message for Duy. The message informs Duy that he (Jean) would like to see only a part of object 1 and from another point of view. Jean sends this message to Duy's computer by selecting send message button 109.

Figure 12:
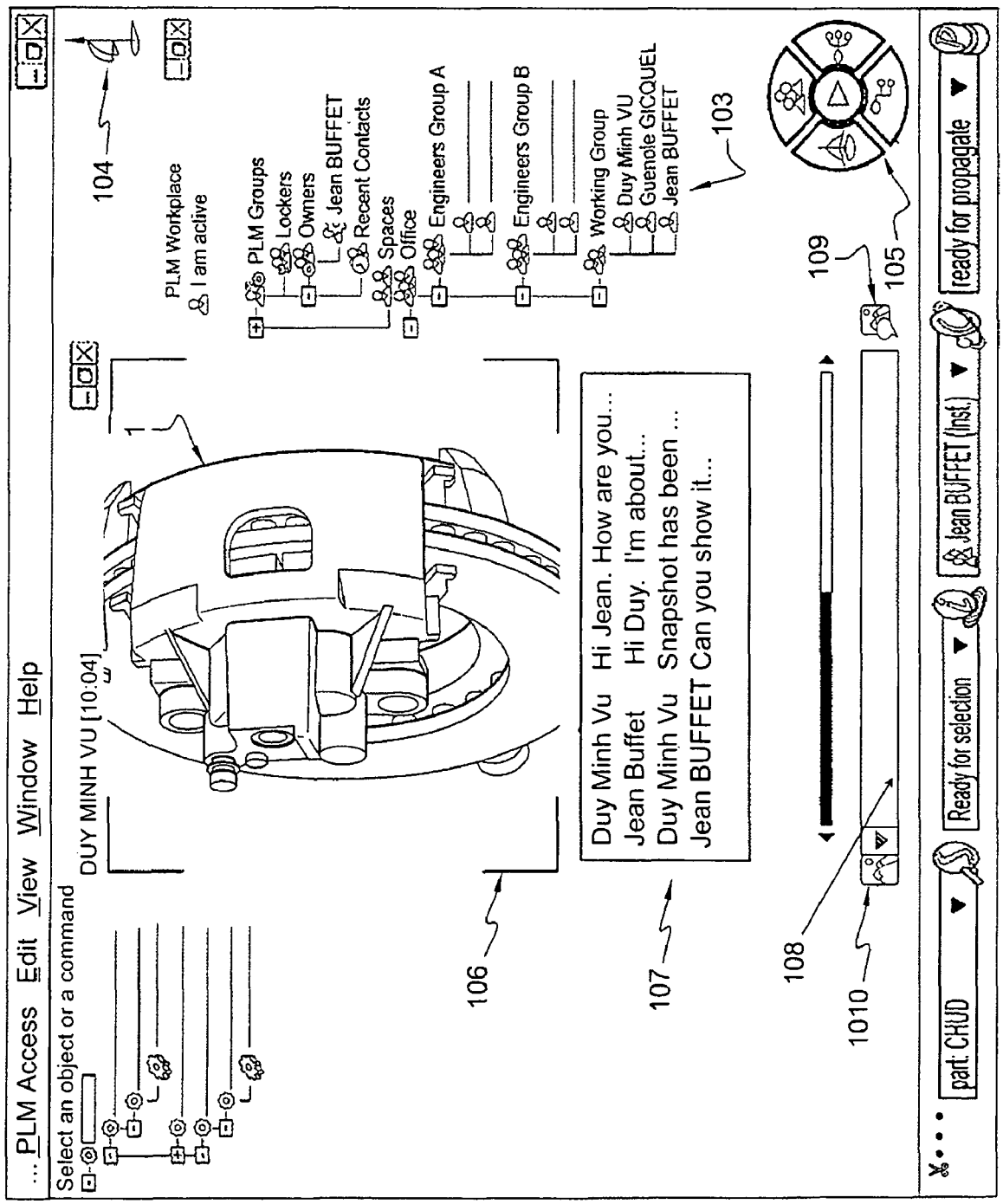

Once sent, this message is displayed in Jean's chat-display box 107 as shown in FIG. 12. Further, Jean removed object 101 from display in his workspace by displacing it in the 3D scene out of the display in view of better seeing object 1.

Figure 13:
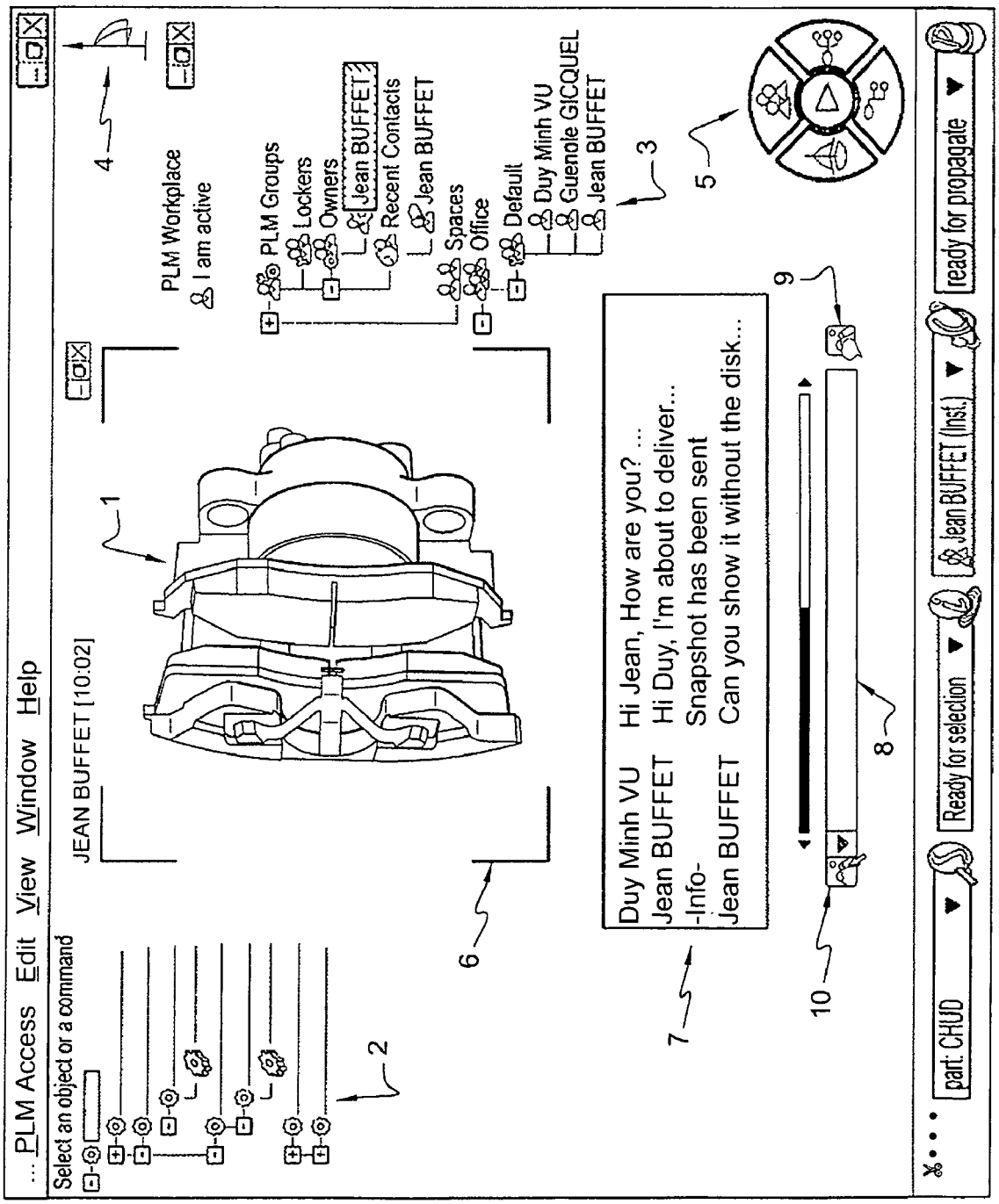

Upon receipt, Duy's computer displays—as shown in FIG. 13—the message sent by Jean's computer, i.e. Jean's message mentioned in relation to FIG. 11. And as a consequence, Duy removes from the display in his workspace the part of object 1 in which Jean is not interested in. Further, Duy changes the point of view of object 1 according to Jean's wish (request). The new resulting context situation of object 1 is shown in FIG. 13.

Subsequently, Duy selects send snapshot button 10 to send a new snapshot to Jean's computer along with corresponding viewing context data.

Figure 14:
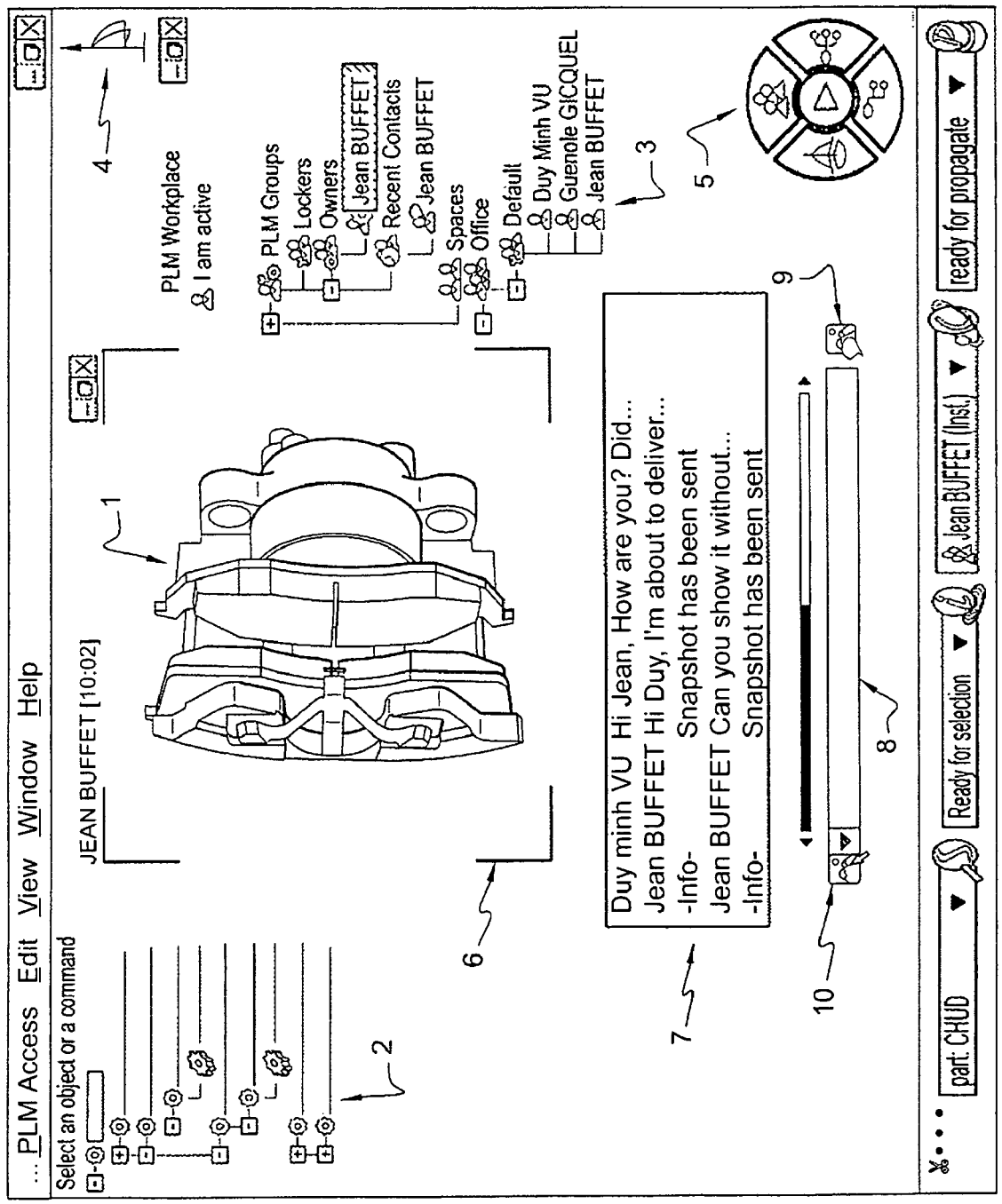

As a result, Duy's computer displays again a message in chat-display box 7 informing that the snapshot has been sent as shown in FIG. 14.

Figure 15:
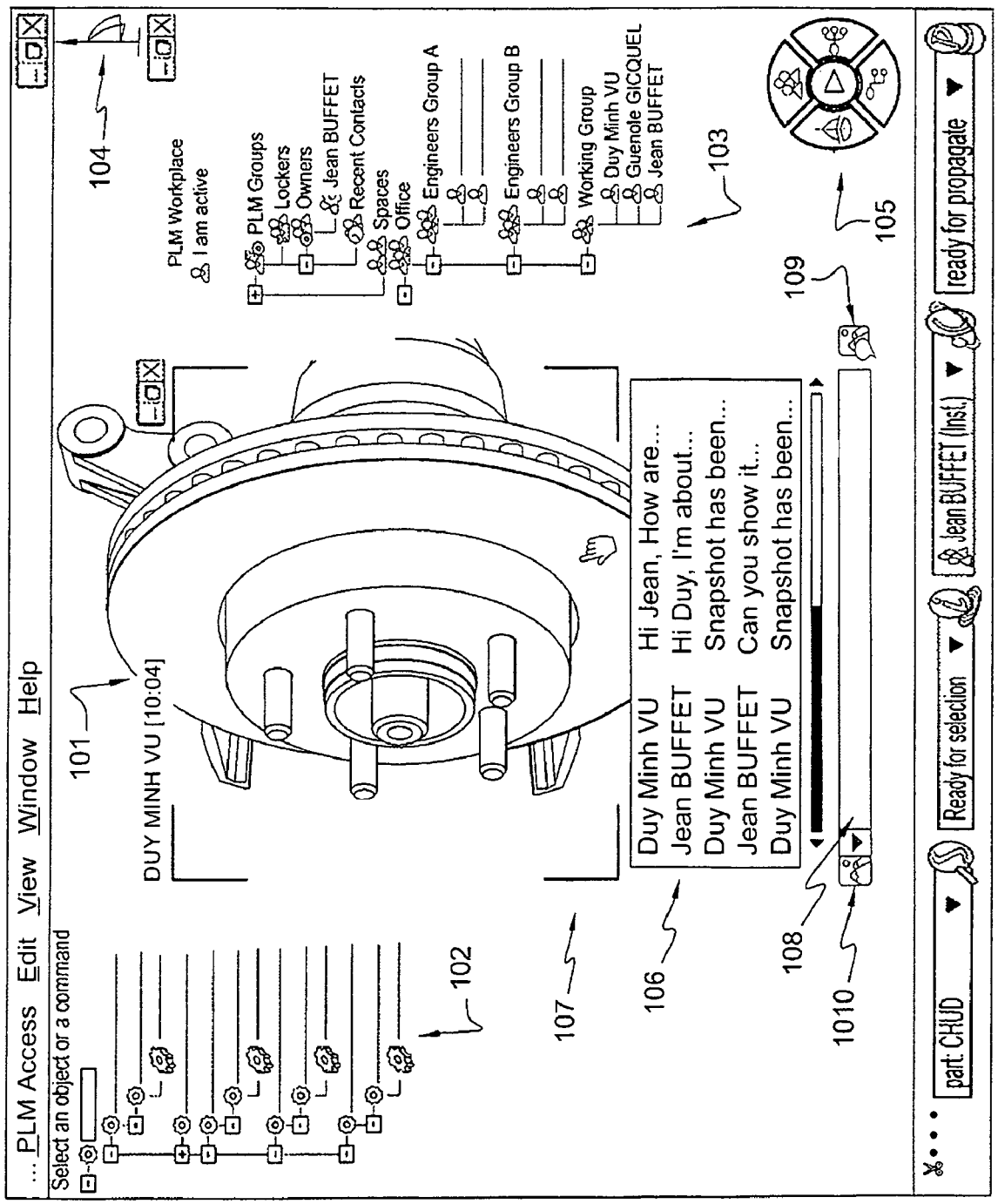

In the meantime, Jean has removed the first received snapshot of object 1 from the display on his workspace and has displayed again object 101 instead as shown in FIG. 15. FIG. 15 shows Jean's workspace once his computer has received the snapshot sent by Duy according to FIGS. 13 and 14. As a result, a corresponding snapshot received message is displayed in chat-display box 107.

In order to download the new snapshot sent by Duy's computer, Jean selects with the mouse the message informing of the receipt of the new snapshot displayed in chat-display box 107 similarly as already done for the first snapshot sent by Duy.

Figure 16:
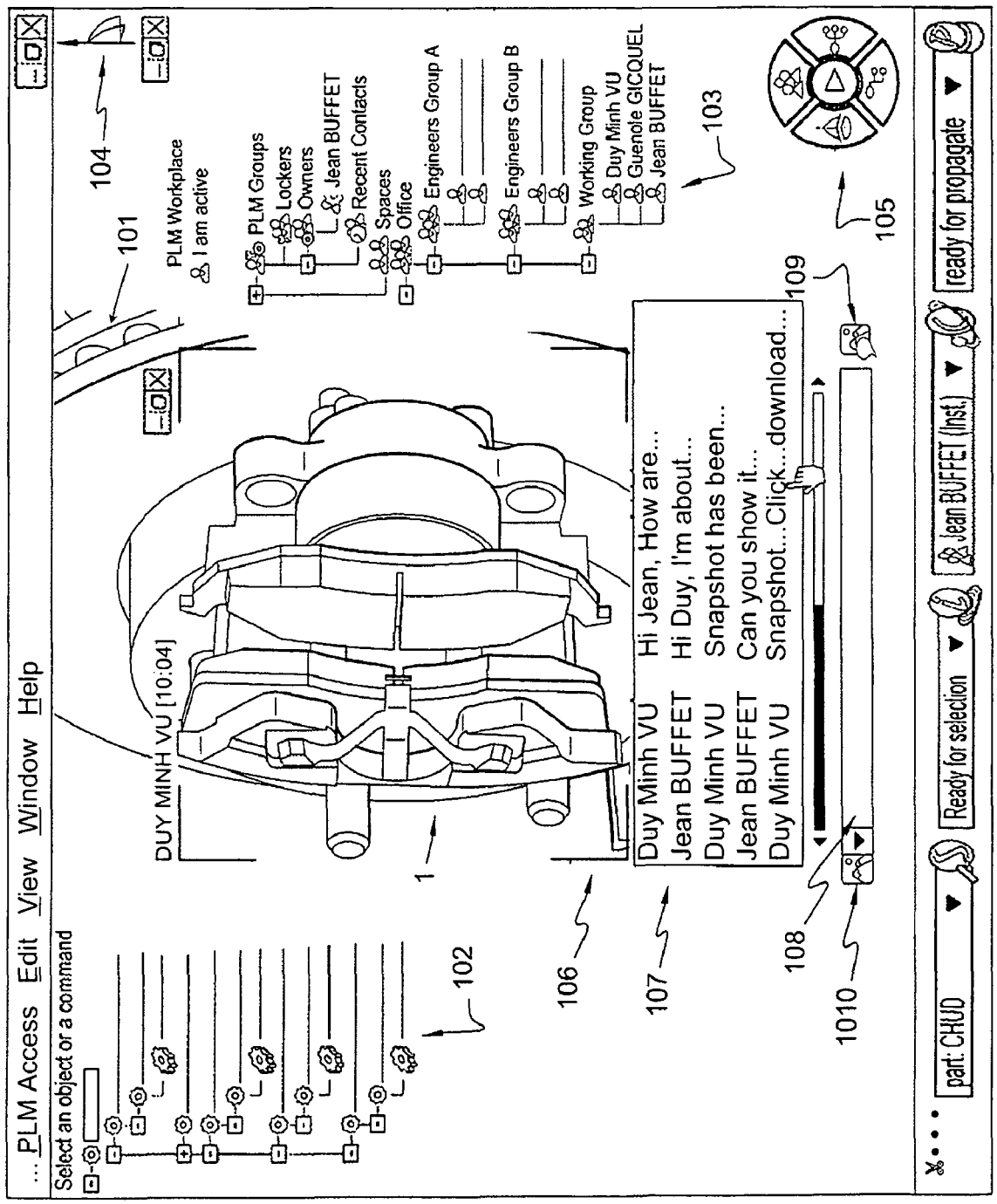

FIG. 16 shows a screenshot of Jean's workspace displayed on his computer as a result of the downloading of the new snapshot sent by Duy's computer.

As can be seen, the snapshot of object 1 as sent by Duy's computer is again displayed above (layered over or superimposed on) object 101. Again, Jean's computer changed the viewing context of object 101 to coincide with the viewing context of the new snapshot of object 1 based on the viewing context data sent along by Duy's computer with the new snapshot.

As a result, Jean can see at least approximately the result of merging object 1 and object 101.

Figure 17:
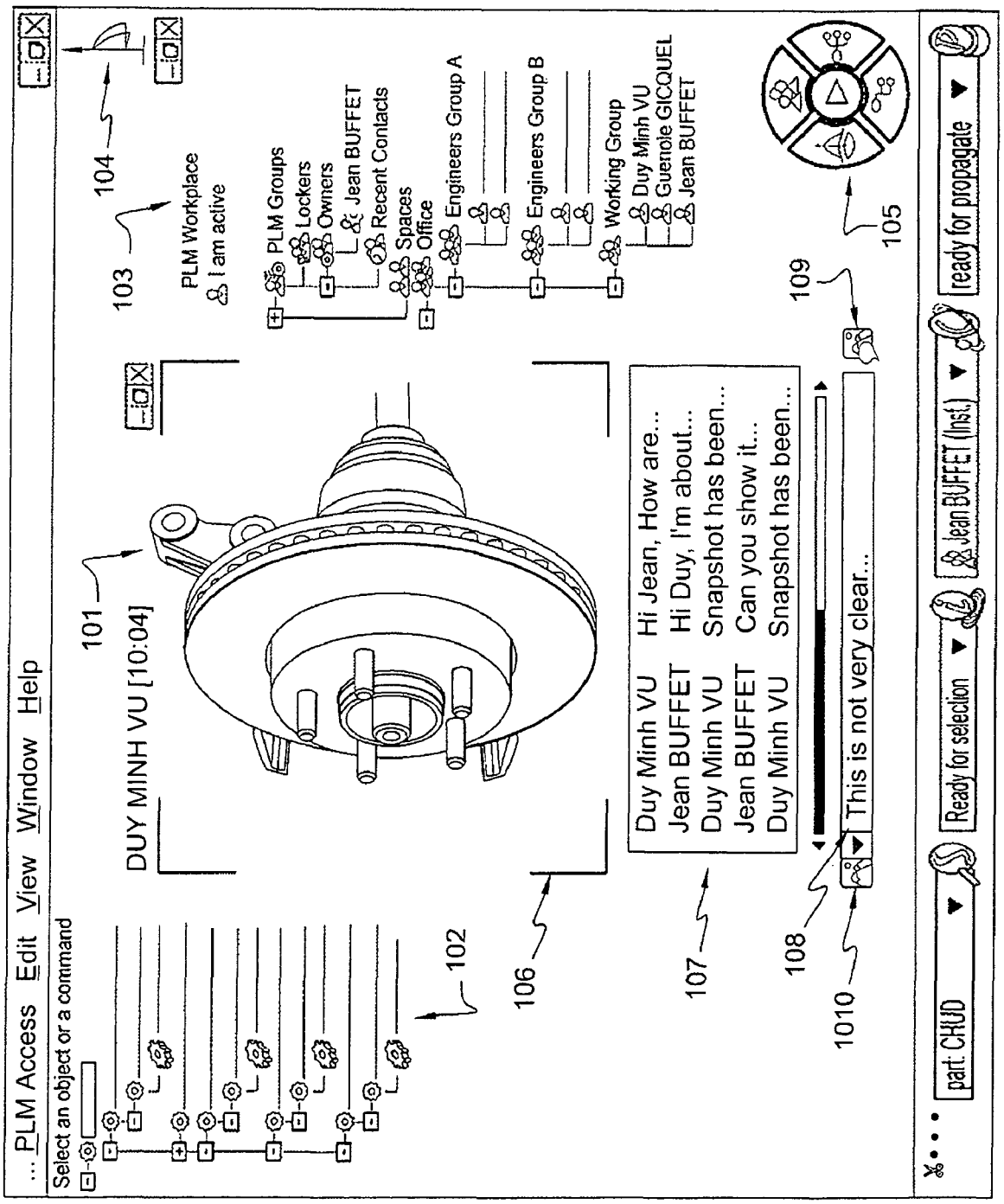

However, as the superimposed display of snapshot 1 and object 101 does not provide a sufficiently realistic view of the real assembly of object 1 with object 101, Jean removes the snapshot of object 1 from his workspace e.g. by clicking on the area defined by the limit of the viewfinder 106. Alternatively, Jean may remove the snapshot of object 1 from his workspace by right clicking with his mouse on the received object or on viewfinder 106; a contextual menu then appears, with various choices available to the user. Among the choices, the user may decide to delete the displayed object, or to display it with a lower level of detail as will be seen below. As a result, the snapshot of object 1 is no longer displayed in Jean's workspace as shown in FIG. 17. Further, Jean types in chat-entry box 108 a further message asking Duy to send a 3D view of object 1. Jean sends this message to Duy's computer by selecting send message button 109.

Figure 18:
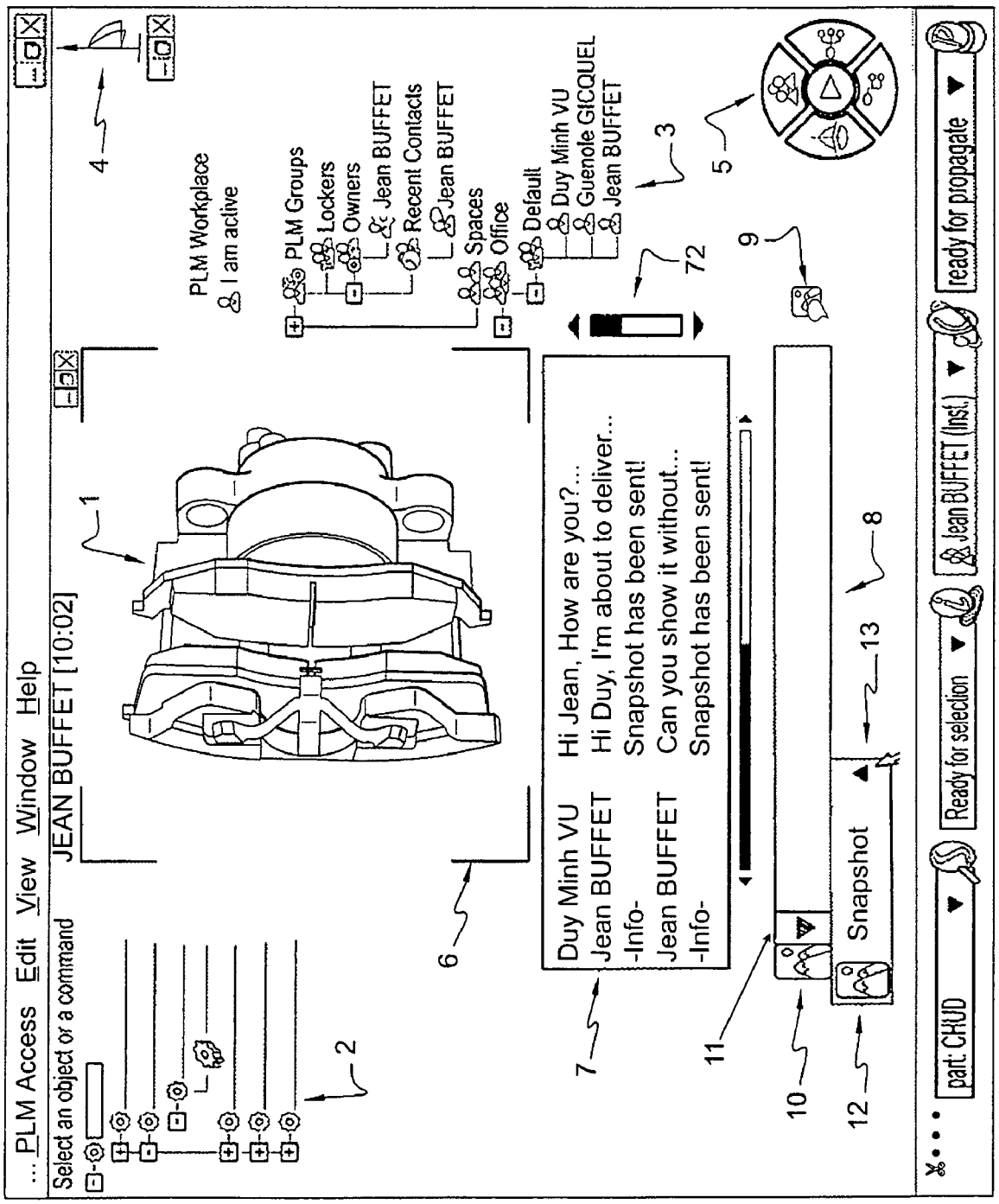

Upon receipt, Duy's computer displays the received message in chat-display box 7 as shown in FIG. 18. So, Duy decides to send the 3D that Jean asked for. Therefore, Duy selects selector 11. As a result, a thumbnail 12 pops up under selector 11. Thumbnail 12 contains the word "snapshot" indicating that the current function of button 10 is to send a snapshot when selected. Thumbnail 12 also contains a selector 13. By selecting with the mouse selector 13, the function of button 10 can be changed to sending a snapped 3D geometry or to sending 3D geometry with full data (not shown in the figures). That is what Duy is about to do in FIG. 18. In another embodiment, selection of the selector 11 directly displays the list of level of detail options, such as an image ("Snapshot"), a snapped 3D geometry, or a 3D geometry with full data (i.e. with the specifications of object 1).

Further, a scrolling bar 72 is displayed at the right hand side of chat-display box 7. Scrolling bar 72 enables the user to scroll up and down the content of chat-display box 7 when all exchanged messages cannot simultaneously be wholly displayed in chat-display box 7.

Figure 19:
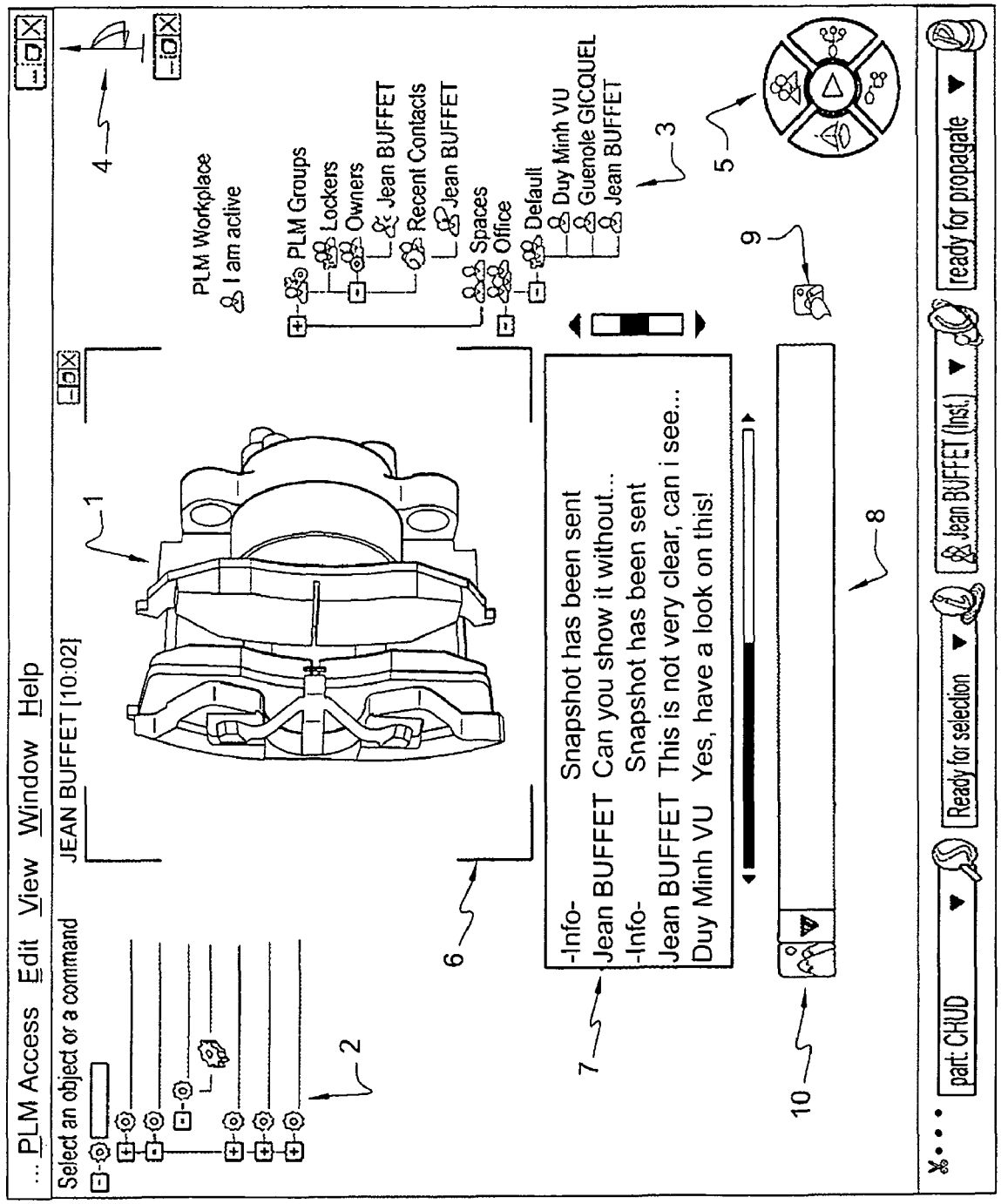

Once the function of button 10 is changed to sending a snapped 3D geometry, Duy types in chat-entry box 8 a message for Jean, and then selects send snapshot button 10. As a result, both the snapped 3D geometry of object 1 and the message typed in chat-entry box 8 are sent to Jean's computer. Further, the message is displayed in chat-display box 7 as shown in FIG. 19. Furthermore, a message—similar to the one shown in FIG. 7—informing that the snapped 3D geometry of object 1 has been sent may be displayed in chat-display box 7.

The snapped 3D geometry of object 1 sent to Jean's computer comprises all the solid geometry data of the parts (allowing 3D representation thereof for any point of view and any scale) of object 1 which are at least partly located within viewfinder 6. One will understand that not only the solid geometry data of the part of object 1 comprised within viewfinder 6 are sent, but all the solid geometry data of object 1 within viewfinder 6 as well as those parts intersecting the perimeter of viewfinder 6. However, solid geometrical data of an object are sent only as long as at least a part of the object is currently within viewfinder 6 at the time snapshot button 10 is selected. Viewing context data are sent along with the solid geometry data of object 1 for defining the actual viewing context of object 1 as displayed on Duy's GUI at the time of sending the snapped 3D geometry to Jean's computer. So, Jean's computer has the possibility to display object 1 in the same viewing context as at Duy's computer and to change the display of object 101 to the same viewing context. Alternatively, the solid geometry data are sent without viewing context data as it is also possible for Jean's computer to display object 1 and object 101 in a same viewing context in this case.

However, the specification of object 1 is not sent along with the solid geometry data of object 1.

Alternatively, Duy's computer only sends an information to Jean's computer about a path in the network—e.g. a path to a database connected to the network, the database containing the data of the assembly on which Duy and Jean are working—where Jean's computer can download the solid geometry data of object 1. In this case, it is however preferred that Duy's computer sends the viewing context data to Jean's computer so as to avoid the fact that Duy's computer would have to provide first the viewing context data at the location in the network corresponding to said path.

Figure 20:
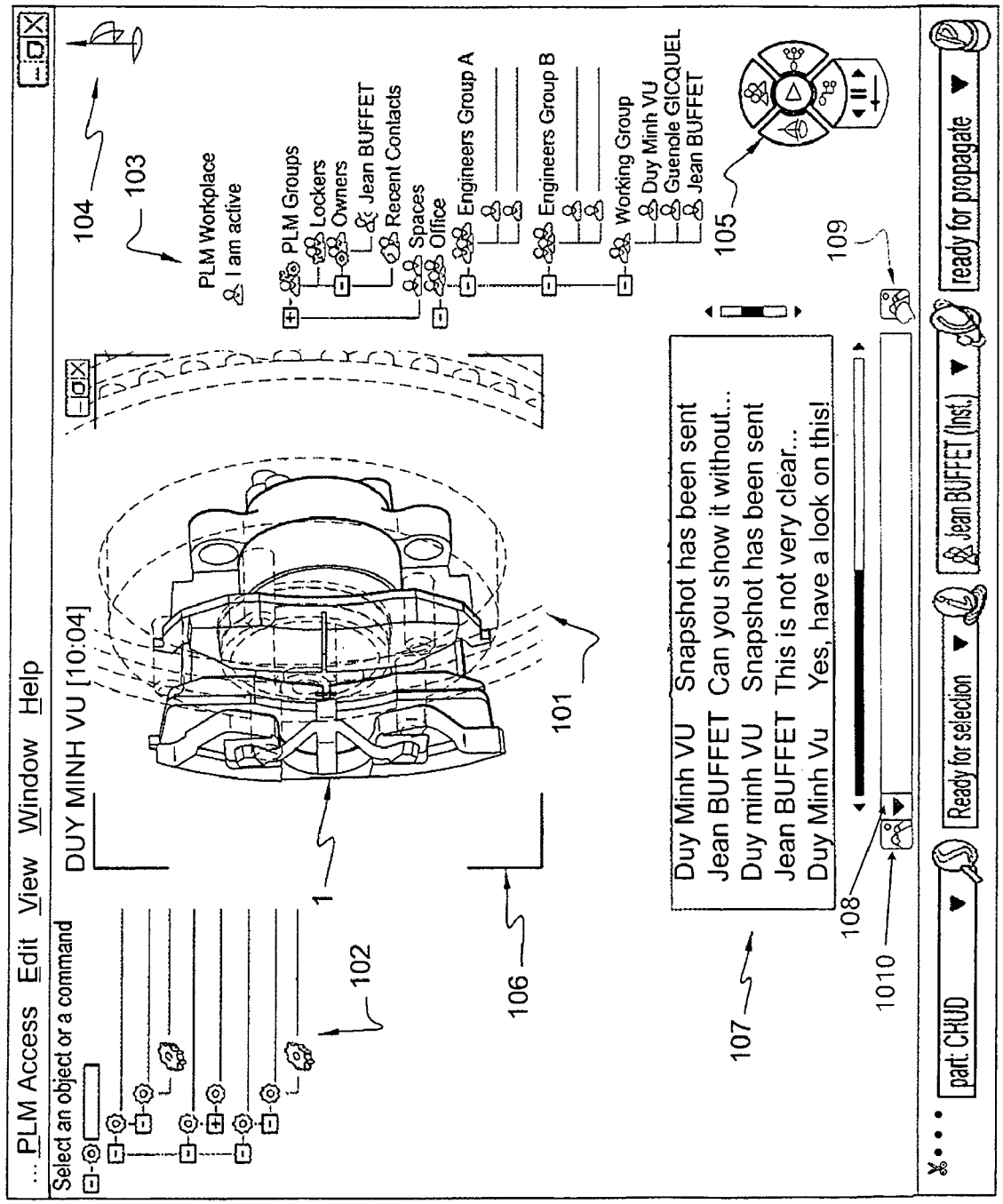

FIG. 20 shows a screenshot of Jean's workspace displayed on his computer as a result of the downloading of the snapped 3D geometry. Although not visible in FIG. 20, chat-display box 107 contains a message—similar to the one shown in FIG. 9—informing that the snapped 3D geometry sent by Duy has been received by Jean's computer and that it is ready for download to be viewed. Jean caused his computer to download the received snapped 3D geometry by selecting with the mouse the message informing of the receipt of the snapped 3D geometry similarly as explained for the case of a sent snapshot in relation to FIG. 9.

As can be seen, both object 1 and object 101 are displayed in Jean's workspace itself, i.e. in his authoring environment in which he works on object 101 at the time he is not involved in a collaborative work. Object 101 is displayed in the 3D scene of object 1 in a combined representation thereof. Since all the snapped 3D geometry is sent, the positional matrix is also sent to Jean's computer. Therefore, the position of object 1 sent is perfectly integrated in the scene of object 101, i.e. object 1 and object 101 are not displayed in superimposed condition but in merged condition (e.g. in intermingled condition in the case object 1 and object 101 are actually intermingled parts). So, in the example of FIG. 20, the caliper of object 1 is surrounding the brake disc of object 101. Both object 1 and object 101 are displayed in a same viewing context, i.e. same point of view and same scale. This is possible as the solid geometry data of object 1 are available at Jean's computer. Further, object 1 is displayed at Jean's computer in the same viewing context as on Duy's computer and object 101 was consequently changed to this same viewing context by Jean's computer. Alternatively, object 1 may be displayed at Jean's computer in the same viewing context as for object 101 displayed at Jean's computer at the time he downloaded the snapped 3D geometry of object 1. However, object 1 is displayed as an opaque object while object 101 is displayed as a dulled element. Thus, Jean can see at least approximately the result of the real merging object 1 and object 101. The fact that object 101 is dull provides a more realistic view of what the result of the real merging of object 1 and object 101 would be. Nevertheless, it is also possible for Jean to get object 1 dulled and object 101 opaque with object 1 displayed on object 101.

Figure 21:
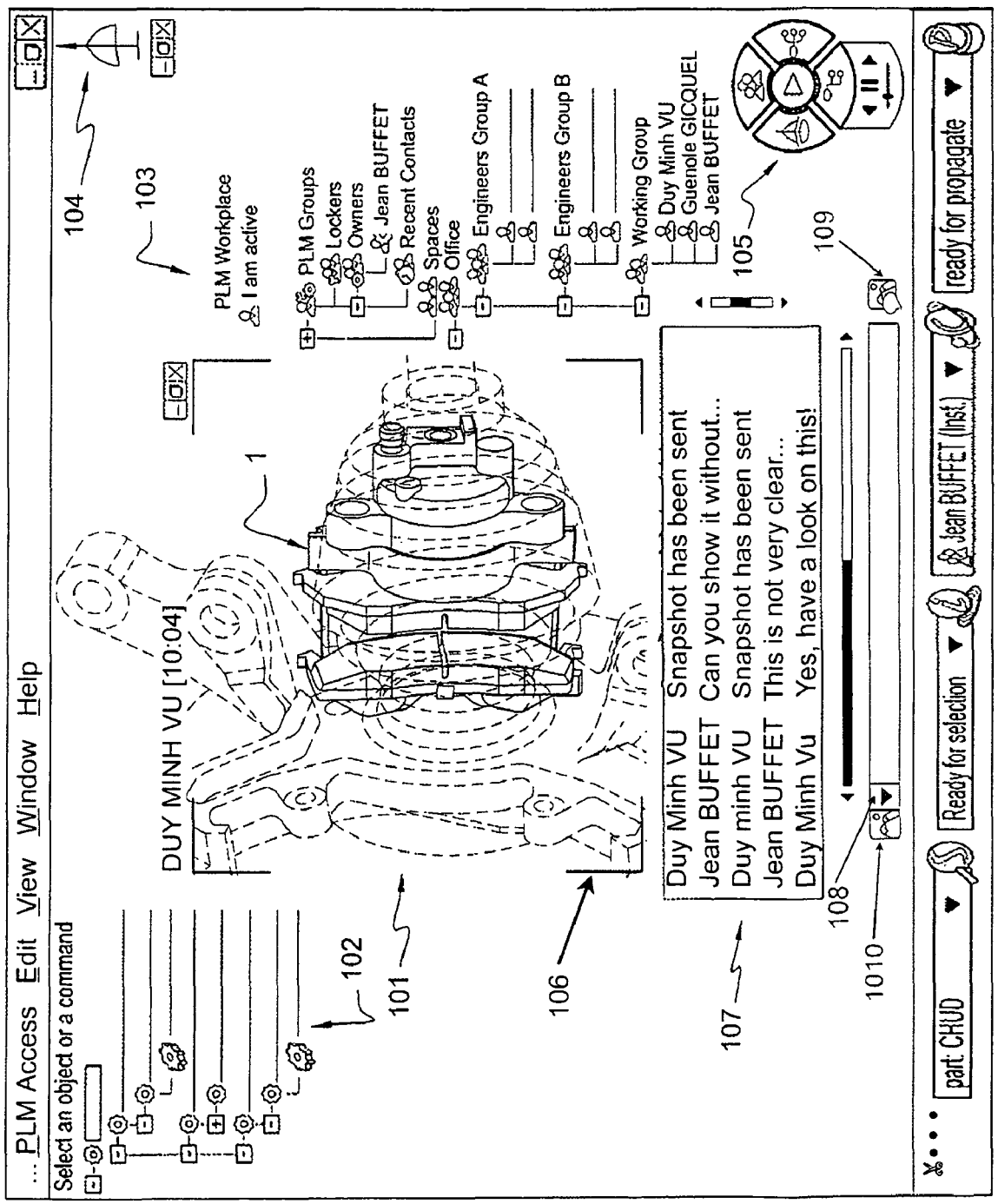

Jean has also the possibility to change the viewing context of object 1 and object 101 e.g. by dragging some point of at least one the objects with help of his mouse. One will understand that the viewing context remains common to both objects when the user modifies it. For instance, both objects are rotated about the same axis simultaneously. The result of such a viewing context change, in particular a rotation about vertical axis Z, is shown in FIG. 21 illustrating Jean's workspace after this change.

Figure 22:
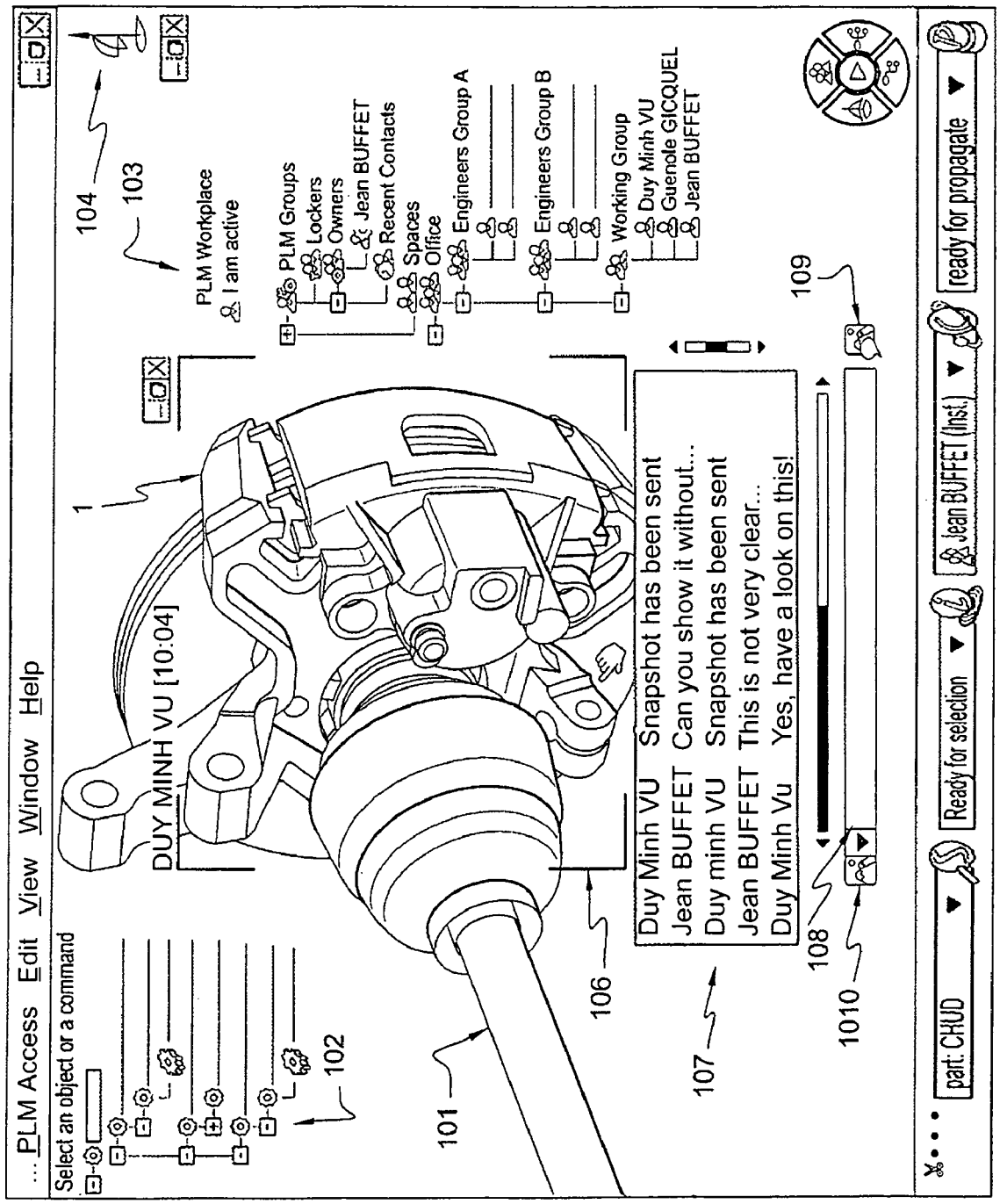

Finally, Jean may also be given by Duy the possibility to download the whole specifications of object 1 in his authoring environment and as a consequence to incorporate object 1 with its specification in its workspace. FIG. 22 is illustrative. At this ultimate level of detail, selectable through the selection button 11, an object may be sent with all its data, i.e. its solid geometry data (allowing 3D representation of object 1 under any point of view and scale) and its whole specifications such as dimensioning, positioning, tolerancing and any other attributes attached to said object such as material, owner, status, configuration, but also its links to other parts of the assembly, etc. Of course, this is only possible if Duy has the rights to send them (rights managed by the product data management tool). Jean has the required rights to receive any object sent to him, but will only be able to modify said object if its authoring tool is designed for, and will be able to save the modifications only if he has the required rights therefore. In the case where a user receives an object with its full specification, a real merge of both objects may be achieved and displayed based on the information sent and received through the viewfinder 6 and the information existing in the current editor of the receiver. Therefore, the related databases are updated to reflect the changes in the design.

For giving Jean the possibility to download the whole specification of object 1, Duy's computer may simply send an information to Jean's computer about a path in the network—e.g. a path to a database connected to the network, the database containing the data of the assembly on which Duy and Jean are working—where Jean's computer can download the whole specification of object 1. Here again, it is preferred that Duy's computer provides viewing context data to Jean's computer when giving the latter the possibility to download the whole specification. But alternatively, the possibility to download the whole specification is provided by Duy's computer without viewing context data as it is also possible for Jean's computer to display object 1 and object 101 in a same viewing context in this case.

If the receiver—i.e. Jean—wishes to propose modifications to the sender—i.e. Duy—about the sender's object—i.e. object 1—, he can do so when the sender provided him with the second level of detail (snapped 3D geometry) or the third type (full data) about the sender's object. More particularly, the receiver makes modifications on the sender's object displayed in the receiver's workspace and then causes his computer to send the modified sender's object back to the sender's computer. The sender's computer can in turn display the object modified by the receiver in its authoring environment. The modified object may be displayed alone on the GUI of the sender's computer. Alternatively, it may be displayed together with the object before modification in the same viewing context either in superimposed condition or in intermingled condition so that the sender may better see the proposed modifications. In the case the receiver made the modifications on the full data representation (previously received from the sender), then the sender can replace his object by the one modified by the receiver by incorporating it its own workspace—i.e. integrating it into the design—in the case the sender agrees with the proposed modifications.

In addition, Jean has the possibility to view the received object sent with full data through a snapped geometry or a simple snapshot (lower levels of details) by right clicking on the viewfinder 6 and choosing the relevant option in the displayed contextual menu.

One will understand that common sessions could be defined in order to lead a single session versus multiple collaborators, and in such a case multiple received objects could be seen and displayed through a single viewfinder 6, allowing to preview the collaborative work of the involved distributed team. In another embodiment, a same user can simultaneously enter several collaborative work sessions each with another collaborator. In particular, he may collaborate with each collaborator on a respective part of its own object. In such a case, each collaborative session has its respective elements—i.e. viewfinder 6, chat-display box 7, chat-entry box 8, etc—displayed in the workspace of this same user.

The invention has been described with reference to preferred embodiments. However, many variations are possible within the scope of the invention.

Figure 23:
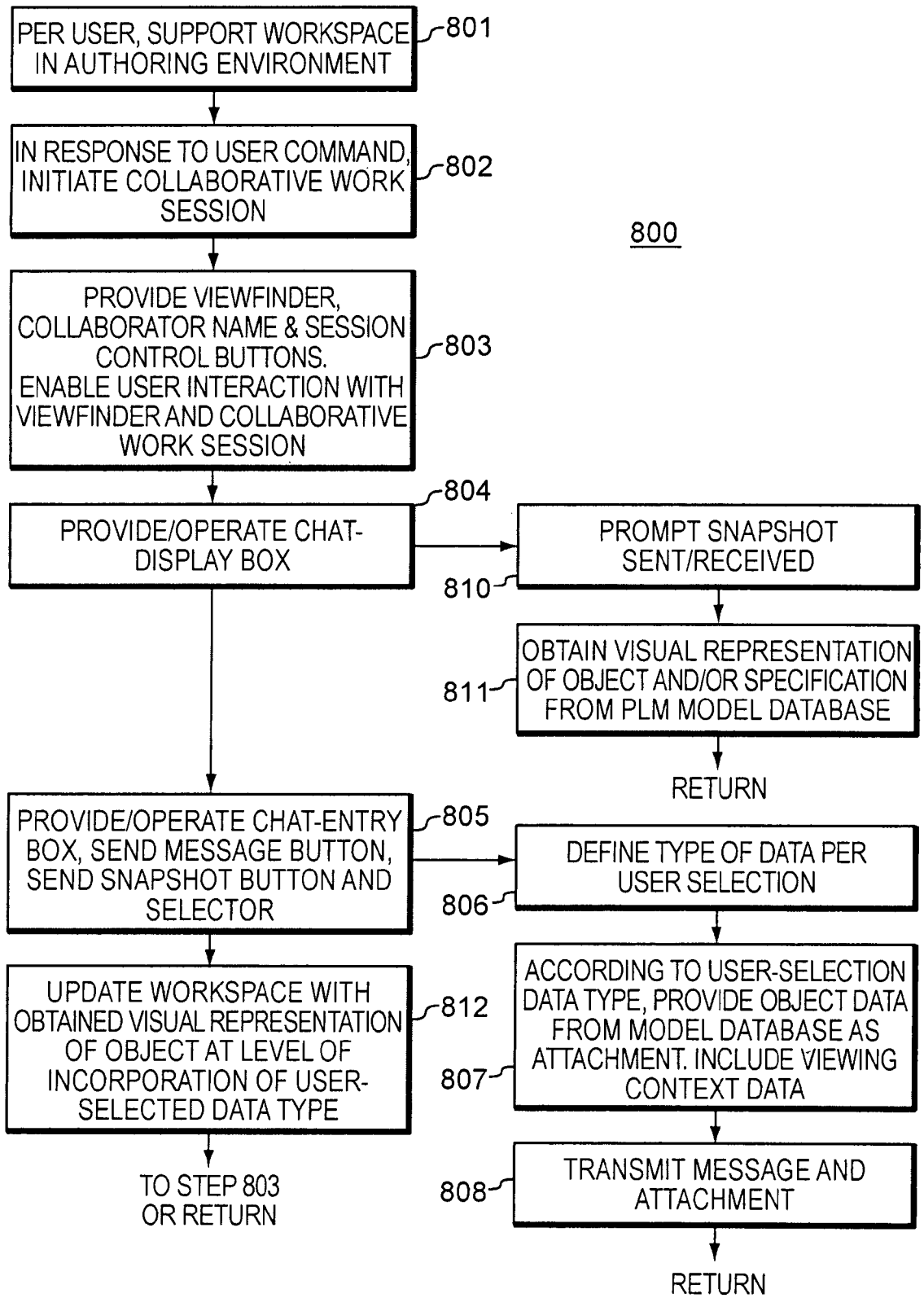
FIGS. 23 and 24 are flow and schematic diagrams of a computer system in which embodiments of the present invention are implemented.
Figure 24:
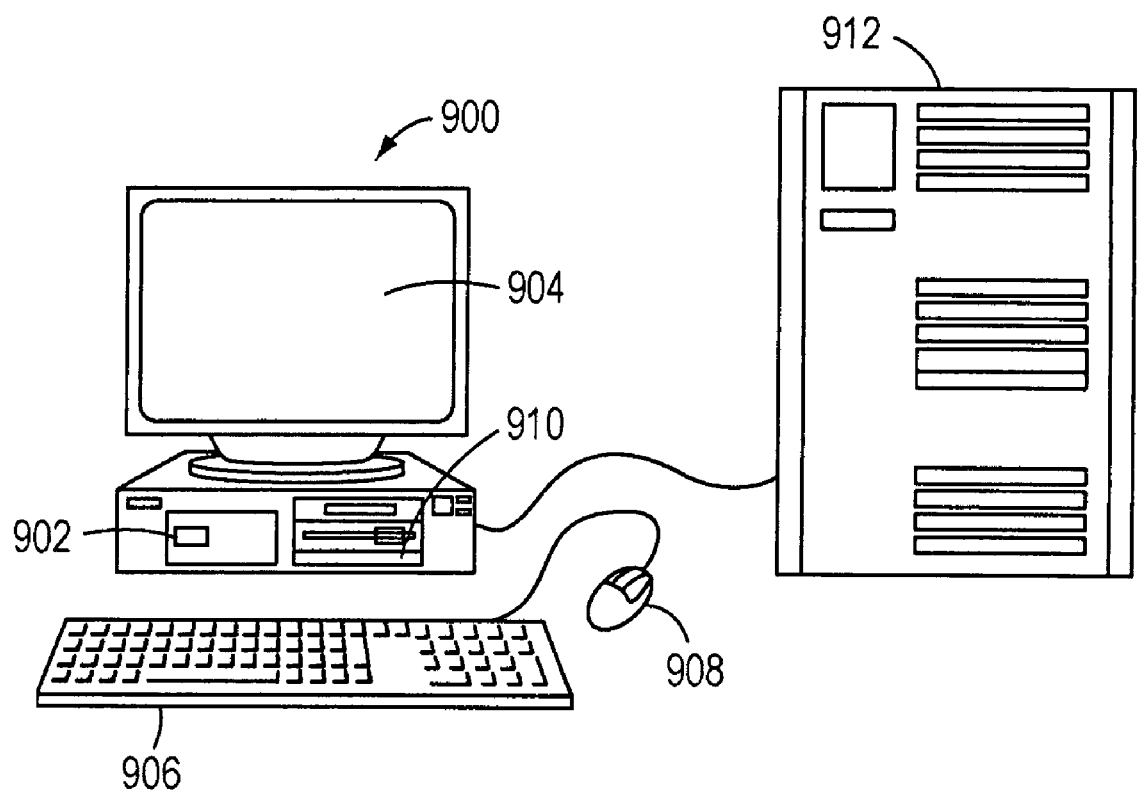

FIGS. 23 and 24 provide computer system configuration (process and architecture) of embodiments carrying out the present invention collaborative work sessions in modeling and product lifecycle information systems. In particular, FIG. 23 is a flowchart of a procedure 800 implemented by an embodiment of the present invention. The procedure 800 may run as a part of a PLM system, CAD system or other object modeling system.

For each user, step 801 of procedure 800 maintains a respective user workspace in an authoring environment of a respective computer. Thus a first user workspace is maintained in an authoring environment of a first local computer and a second user workspace is maintained in a respective authoring environment of a second computer. The first local computer and the second computer are connected via a computer network. Moreover, for the first user working on a first object (object 1), step 801 supports display of a visual representation of the object in the authoring environment of the first local computer along with display and operation of trees 2, 3 and tools 4, 5 (FIG. 1) related to the object. Step 801 (and steps 807, 811 described later) utilizes models of the PLM model database for displaying object 1 and for providing data (e.g. solid geometry data, specifications, etc) about object 1.

Upon the first user issuing a command to collaborate with another user, e.g. the second user, step 802 initiates a collaborative work session. As described above in the example scenario of FIGS. 1-22, the user command for initiating collaboration may be selection of the second user's name 33 in the PLM workplace tree 3 or use of a respective toolbar 34 (FIG. 3). Other command implementation is suitable.

As a result of the initiation of a collaborative work session, step 803 provides view finder 6 about displayed object 1, display of collaborator (second user) name 61 and display and operation of session control buttons 62 as discussed above in FIG. 4. Step 803 supports user interaction with the view finder (e.g. changing location and/or size) and supports minimizing/restoring/closing of the work session display according to user operation of control buttons 62.

Step 804 further provides display and operation of chat-display box 7 and step 805 provides display and operation of chat-entry box 8, with corresponding send message button 9, send snapshot button 10 and selector 11 as described above in FIG. 4. In particular, steps 804, 805 operate similar to an electronic chat forum or instant/email messaging system, tallying correspondence between the first user and the collaborator (second) user in the chat-display box 7 and composing a correspondence message in the chat-entry box 8. A visual representation of object 1, in one data type or another, serves as an attachment for the message in the chat-entry box 8 as detailed next.

With regard to send snapshot button 10 and selector 11, upon first user operation of these elements, step 806 defines a type of data for the subject visual representation of object 1 (i.e. used as a message attachment to the contents of chat-entry box 8). The type of data (candidate data types) may be: an image (snapshot), a snapped 3D geometry, or a 3D geometry with full data specification from the PLM model database. The later two types are provided as selection options of selector 11. With user selection of the send snapshot button 10, step 806 defines the data type to be a snapshot or image of object 1 displayed in the first user's workspace. With user selection of a snapped 3D geometry (via selector 11 option), step 806 defines the data type to be a snapped 3D geometry of object 1. With user selection of a 3D geometry with full specification (via selector 11), step 806 defines the data type to be a 3D geometry with full data specification of object 1.

According to user-selected data type (defined at step 806), step 807 provides object 1 data from PLM model database and/or from the local computer workspace display (image thereof) and attaches the same to the message in chat-entry box 8. Viewing context data is also included in the attachment. A positional matrix is also included with the object geometry data in the case of snapped 3D geometry type. Upon first user operation of send message button 9, step 808 transmits the message and attachment(s) to the collaborator (second) user computer and workspace.

In turn, substep 810 of step 804 indicates to the first user that his message and attachments were sent (e.g. in chat display box 7 in FIG. 7).

In addition, substep 810 of step 804 in the second user's computer prompts the second user that a snapshot or other visual representations of object 1 has been received (e.g. in chat display box 107 in FIG. 8). Upon second user command, step 811 obtains the corresponding visual representation of object 1 and any specification data from the PLM model database depending on the data type defined by first user i.e. sender of the message.

Step 812 then allows the second user to optionally update his workspace with the obtained visual representation of object 1 according to the first user defined data type as discussed above in FIGS. 9-22. That is, for snapshot (image) data type, step 812 allows the second user to display and view an image of object 1 in the authoring environment of his computer. Viewing context data enables the second user to adjust point of view and scale of the object image but there is no solid geometry data to otherwise manipulate the visual representation of object 1. For a snapped 3D geometry data type, step 812 allows the second user to view a non-committal but partially merged (of some parts) visual representation of object 1 in the authoring environment of his computer. Step 812 employs the positional matrix to accomplish this. For a 3D geometry with full data specification data type, step 812 allows the second user to merge object 1 (and its corresponding data specifications) into his workspace and into his object being modeled therein.

One embodiment includes a zone delimiting ability in step 803. For the first user, the zone delimiting in the authoring environment of the first computer determines the parts of the object 1 for which visual representation data are comprised. The zone delimiting in the authoring environment of the second (collaborator user) computer defines the area in which the received visual representations of the object 1 is displayed.

Other embodiments have other features and implementations as described previously.

Procedure 800 repeats steps 803-812 continuing the collaborative work session. At the end of the collaborative work session procedure 800 returns control to the main PLM system, CAD system or modeling system.

Referring now to FIG. 24, a computerized modeling or product lifecycle management system 900 is shown and includes a CPU 902, a computer monitor 904, a keyboard input device 906, a mouse input device 908, and a storage device 910. The CPU 902, computer monitor 904, keyboard 906, mouse 908, and storage device 910 can include commonly available computer hardware devices. For example, the CPU 902 can include a Pentium-based processor. The mouse 908 may have conventional left and right buttons that the user may press to issue a command to a software program being executed by the CPU 902. As an alternative or in addition to the mouse 908, the computerized modeling/PLM system 900 can include a pointing device such as a trackball, touch-sensitive pad, or pointing device and buttons built into the keyboard 906. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows NT, Windows 98, Windows 2000, Windows XP, Windows ME, UNIX, Linux, or MAC OS operating systems.

Additional computer processing units and hardware devices (e.g., rapid prototyping, video, and printer devices) may be included in the computerized modeling/PLM system 900. Furthermore, the computerized modeling system 900 may include network hardware and software thereby enabling communication to a hardware platform 912, and facilitating communication between numerous computer systems that include a CPU and a storage system, among other computer components.

Computer-aided modeling software or product lifecycle management software of the present invention may be stored on the storage device 910 and loaded into and executed by the CPU 902. An example portion (procedure 800) of such software is illustrated in FIG. 23. The modeling/PLM software allows users to collaborate over a 3D model and implements aspects of the invention described herein. The CPU 902 uses the computer monitor 904 to display visual representations of 3D models in a collaborative work session and other aspects thereof as described. Using the keyboard 906 and the mouse 908, the user can enter and modify data associated with the collaborative work session. The CPU 902 accepts and processes input from the keyboard 906 and mouse 908. The CPU 902 processes the input along with the data associated with the collaborative work session and makes corresponding and appropriate changes to that which is displayed on the computer monitor 904 as commanded by the invention modeling/PLM software. In one embodiment, the modeling/PLM software employs an electronic message (or chat) system and similar technology for supporting collaborative work sessions.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

An advantage of the present invention is that collaboration between design engineers is enabled in meaningful levels of data sharing. An advantageous range of data sharing (from viewing to merging 3D geometrical data) among collaborators is provided by the present invention. A design engineer can view a snapshot of other's objects relative to his work object in progress in his workspace (authoring environment). He can view a partial merge of the geometric data of these objects in his workspace (authoring environment). He can finally incorporate (download) specifications of objects into his authoring environment.

Other advantages of the present invention include giving design engineers the ability to collaborate over CAD parts and have design data within one or more of those CAD parts presented in an easily usable way (e.g. same scale, point of view, etc.) in respective authoring environments. A further advantage includes giving each design engineer the ability to readily use design data without the design engineer having to process design data in multiple workspaces (an individual workspace and a separate collaboration workspace) or without benefit of a noncommittal viewing or lower levels of incorporation of other's design data.

In one embodiment, the authoring environment/workspace of a design engineer becomes the collaborative workspace upon user command (initiation of a collaborative work session) or use of the collaboration features and operations.

A number of embodiments of the present invention have been described. Nevertheless, it will be understood that various modifications may be made without departing from the spirit and scope of the invention. For example, implementations may change the order in which operations are performed. Furthermore, depending on the needs of an implementation, particular operations described herein may be implemented as a combined operation, eliminated, added to, or otherwise rearranged. Particular user interface operations relative to a mouse (e.g., click, drag, drop, etc.) are by way of illustration and not limitation. Other user interface operations for selecting, moving, placing, etc. model or design data are suitable. Other user interfaces may be used to implement collaborative work sessions of the present invention.

While this invention has been particularly shown and described with references to example embodiments thereof, it will be understood by those skilled in the art that various changes in form and details may be made therein without departing from the scope of the invention encompassed by the appended claims.

What is claimed is:

1. Method of collaborative work between:
    a first user working on a first object on the basis of a visual representation of the first object displayed in a 3D model authoring environment of a first local computer; and
    a second user working in a 3D model authoring environment of a second local computer, the 3D model authoring environment of the second local computer not being the 3D model authoring environment of the first local computer;
wherein the first computer and the second computer are connected via a computer network, the method comprising the steps of:
    a) enabling the first user at the first computer to select one type among a plurality of types of data about the first object, each type of data comprising visual representation data about the first object;
    b) responsive to the first user selecting the one type, providing to the second computer data about the first object according to the selected type;
    c) displaying a visual representation of the first object in the 3D model authoring environment of the second computer.

2. Method according to claim 1, wherein step b) comprises the substep of:
    sending at least a part of the data about the first object according to the selected type from the first computer to the second computer.

3. Method according to claim 1, wherein step b) comprises the substeps of:
    sending information about a path in the network from the first computer to the second computer;
    causing the second computer to download at least a part the data about the first object according to the selected type according to the path in the network.

4. Method according to claim 1, wherein:
    in step b), the data about the first object provided to the second computer comprise viewing context data about the visual representation of the first object as displayed on the screen of the first computer;

in step c), the visual representation of the first object is displayed in the 3D model authoring environment of the second computer in a viewing context corresponding to the viewing context data.

5. Method according to claim 1, wherein the first object is defined by first solid geometry data and specifications, the first solid geometry and specifications being available at the first computer.

6. Method according to claim 5, wherein at least one type among the plurality of types of data about the first object does not comprise specifications so that when selected in step a), specifications are not available at the second computer when carrying out step c).

7. Method according to claim 6, wherein one type of data about the first object comprises the first solid geometry data without specifications so that when selected in step a), specifications are not available at the second computer when carrying out step c).

8. Method according to claim 5, wherein one type of data about the first object comprises the first solid geometry data and specifications.

9. Method according to claim 1, wherein one type of data about the first object comprises a snapshot image of at least a part of the visual representation of the first object as displayed on the screen the first local computer.

10. Method according to claim 1, comprising a step of:
displaying a graphical tool on the screen of the first computer, the graphical tool delimiting a zone in the 3D model authoring environment of the first computer;
wherein the zone delimited by the graphical tool in the 3D model authoring environment of the first computer determines the parts of the first object for which visual representation data are comprised in the data about the first object provided in step b).

11. Method according to claim 10, wherein the zone delimited by the graphical tool is adapted to be resized and/or to be changed of location in the 3D model authoring environment of the first computer.

12. Method according to claim 10, comprising a step of:
displaying a graphical tool on the screen of the second computer, the graphical tool delimiting a zone in the 3D model authoring environment of the second computer;
wherein in step c), the visual representation of the first object in the 3D model authoring environment of the second computer is displayed in the zone delimited by the graphical tool in the 3D model authoring environment of the second computer.

13. Method according to claim 1, comprising a step of:
displaying a chat-entry box and a chat-display box on the screen of the first computer and on the screen of the second computer enabling the first user and the second user to exchange messages via the network.

14. Method according to claim 1, wherein:
the second user works on a second object on the basis of a visual representation of the second object displayed in the 3D model authoring environment of the second local computer;
in step c), the visual representation of the first object is displayed together with a visual representation of the second object in the 3D model authoring environment of the second computer so as to provide a combined representation of the first object and of the second object in a same viewing context.

15. Computer program product comprising a computer readable storage device embodying program code which when executed by a programmable processor implements the steps defined in claim 1 for said first and/or said second computer.

16. Computer program product according to claim 15 configured to allow collaborative work of said first user with said second user, wherein the program code running on said first computer enables said first user:
to select at said first computer said one type among a plurality of types of data about the first object, each type of data comprising visual representation data about said first object; and
to send from said first computer to said second computer said data about said first object according to said selected type and/or information about a path in said network where data about the first object according to said selected type are downloadable.

17. Method of collaborative work between:
a first user working on a first object on the basis of a visual representation of the first object displayed in a 3D model authoring environment of a first local computer; and
a second user working on a second object on the basis of a visual representation of the second object displayed in a 3D model authoring environment of the second local computer, the 3D model authoring environment of the second local computer not being the 3D model authoring environment of the first local computer;
wherein the first computer and the second computer are connected via a computer network, the method comprising the steps of:
a) enabling at the first computer user selection of one type among a plurality of types of data about the first object, each type of data comprising visual representation data about the first object;
b) responsive to user selection at the first computer, providing to the second computer data about the first object according to the selected type;
c) displaying a visual representation of the first object in the 3D model authoring environment of the second computer, together with a visual representation of the second object in the 3D model authoring environment of the second computer so as to provide a combined representation of the first object and of the second object in a same viewing context.

18. Method according to claim 17, wherein:
in step b), the data about the first object provided to the second computer comprise viewing context data about the visual representation of the first object as displayed on the screen of the first computer;
in step c), the visual representation of the first object is displayed in the 3D model authoring environment of the second computer in a viewing context corresponding to the viewing context data.

19. Method according to claim 18, wherein in step c), the visual representation of the first object is displayed together with a visual representation of the second object in the 3D model authoring environment of the second computer so as to provide a combined representation of the first object and of the second object in a same viewing context corresponding to the viewing context data.

20. Method according to claim 17, wherein
the type of data selected in step a) comprises a snapshot image of at least a part of the visual representation of the first object as displayed in the 3D model authoring environment of the first local computer;
in step c), the snapshot of the first object and the visual representation of the second object are displayed in superimposed condition.

21. Method according to claim 17, wherein:
  the second object is defined by second solid geometry data available at the second computer;
  the type of data selected in step a) comprises the first solid geometry data;
  in step c), the first object and the second are displayed in merged condition.

22. Method according to claim 17, wherein the type of data selected in step a) comprises the first solid geometry data; the method comprising after step c) the steps of:
  d) modifying the first object at the second computer;
  e) sending a visual representation of the modified first object from the second computer to the first computer;
  f) displaying the visual representation of the modified first object in the 3D model authoring environment of the first computer.

* * * * *